United States Patent [19]

Ewart

[11] Patent Number: 4,878,183
[45] Date of Patent: Oct. 31, 1989

[54] PHOTOGRAPHIC IMAGE DATA MANAGEMENT SYSTEM FOR A VISUAL SYSTEM

[76] Inventor: Ron B. Ewart, 5451 Hunter Rd., Enon, Ohio 45323

[21] Appl. No.: 73,789

[22] Filed: Jul. 15, 1987

[51] Int. Cl.⁴ .............................................. G11C 8/00
[52] U.S. Cl. .................................. 364/521; 364/518; 364/200; 340/747; 340/799
[58] Field of Search ... 364/521, 518, 522, 200 MS File, 364/900 MS File; 340/747, 750, 799

[56] References Cited

U.S. PATENT DOCUMENTS

| | | | |
|---|---|---|---|
| 4,343,037 | 8/1982 | Bolton | 364/521 |
| 4,583,185 | 4/1986 | Heartz | 364/521 |
| 4,622,632 | 11/1986 | Tanimoto et al. | 364/200 |
| 4,715,005 | 12/1987 | Heartz | 364/521 |
| 4,729,127 | 3/1988 | Chan et al. | 382/56 |
| 4,737,916 | 4/1988 | Ogawa et al. | 364/443 |
| 4,742,474 | 5/1988 | Knierim | 364/521 |
| 4,742,558 | 5/1988 | Ishibashi et al. | 382/56 |

*Primary Examiner*—Gary V. Harkcom
*Assistant Examiner*—Phu K. Nguyen
*Attorney, Agent, or Firm*—Bernard E. Franz; Donald J. Singer

[57] ABSTRACT

The system can be used to generate an image for visual systems, such as an out-the-window image for flight simulator systems. It comprises a photographic based image generator which creates realistic video images in real time for display on a raster scan monitor or visual display. The system is based on two general principles which would be used separately or in combination to simplify the processing of digitally stored video images. The first principle is the interlacing of the digital information which is stored on a disk. Rather than storing a contiguous picture of sections of a picture, the technique stores a digitized photograph as a series of cells. Each cell contains information which is interlaced in both the horizontal and vertical direction with respect to the preceding and succeeding cell. The second principle is the use of a virtual type of photo memory which allows selective updating of picture information. It simultaneously minimizes the total quantity of digitized data which must be stored at any one instant in time.

4 Claims, 30 Drawing Sheets

INITIAL VIRTUAL MEMORY LOADED WITH LEVELS A & B

CELL LEVELS A & B INTERLACED WITH C

CELL LEVELS A THRU C INTERLACED WITH D

CELL LEVELS A THRU D INTERLACED WITH E

CELL LEVELS A THRU E INTERLACED WITH F

Fig. 3e

CELL LEVELS A THRU F INTERLACED WITH G

Fig. 3f

CELL LEVELS A THRU G INTERLACED WITH H

CELL LEVELS A THRU H INTERLACED WITH I

Fig. 3 h

INITIAL VIRTUAL MEMORY WITH LEVELS A & B

CELL LEVELS A & B INTERLACED WITH C

CELL LEVELS A THRU C INTERLACED WITH D

Fig. 4c

CELL LEVELS A THRU D INTERLACED WITH E

Fig. 4d

CELL LEVELS A THRU E INTERLACED WITH F

Fig. 4e

CELL LEVELS A THRU F INTERLACED WITH G

Fig. 4f

CELL LEVELS A THRU G INTERLACED WITH H

Fig. 4g

CELL LEVELS A THRU H INTERLACED WITH I

Fig. 4h

NOTE:
Assume all cells have top left corner at (0.0),
Type of cell and bottom right corner are labeled

DIAGRAM OF GROUND SHOWING HOW ADJACENT
CELLS AND AREAS OF COVERAGE ARE RELATED.

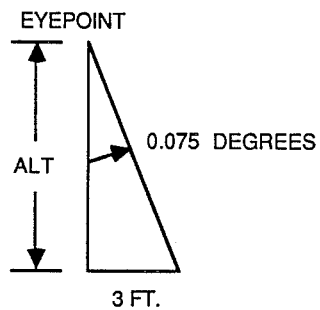
Fig. 6
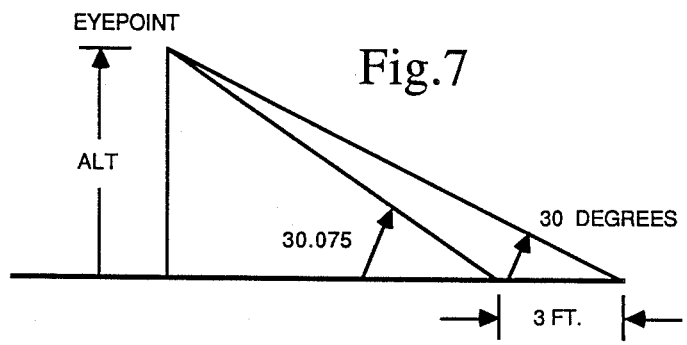
LOOKING AT A 30 DEGREE DEPRESSION ANGLE
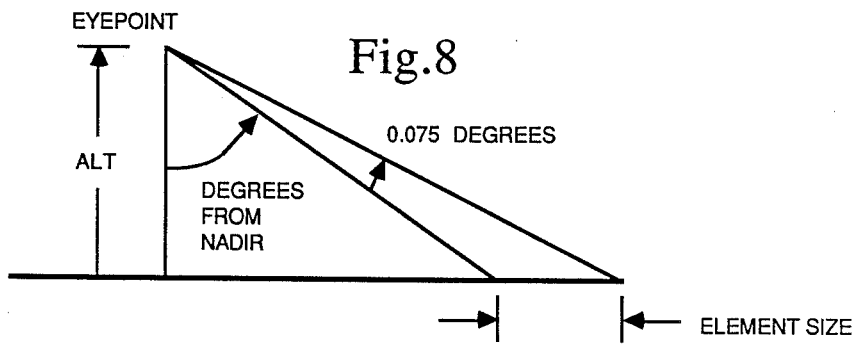
ELEMENT SIZE VS LOOK ANGLE AT 2291 FT. ALTITUDE

MAP OF GROUND ALONG OUTER CELL BOUNDARY

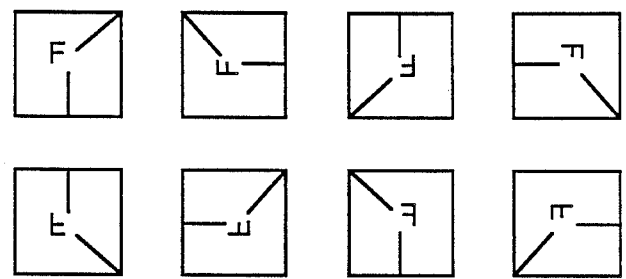
Fig. 12a  BLOCK F
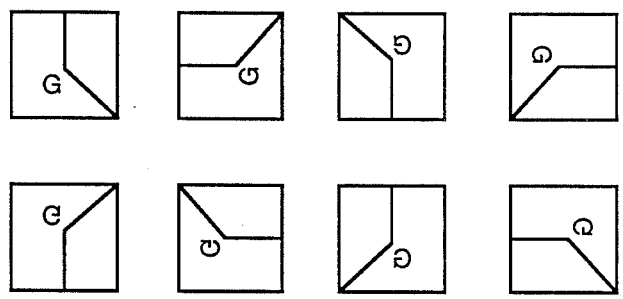
Fig. 12b  BLOCK G
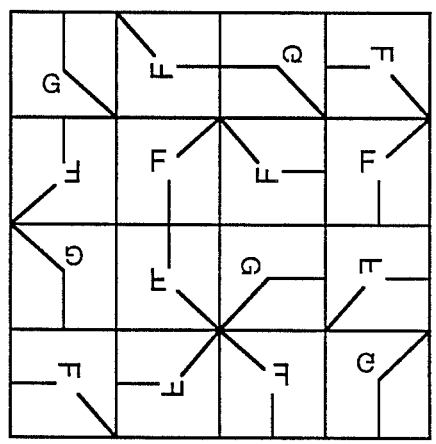
GENERIC AREA MADE UP FROM
BLOCKS F & G
Fig. 12c STEP 1a STEP 1b

STEP 2 - 3

STEP 4

STEP 5

STEP 6

CELL "I"

CELL "A"

Fig. 21a

CELL "B"

Fig. 21b

CELL "C"

Fig. 21c

CELL "D"

Fig. 21d

CELL "E"

Fig. 21e

CELL "F"

Fig. 21f

CELL "G"

Fig. 21g

CELL "H"

Fig. 21h

INITIAL VIRTUAL MEMORY LOADED WITH LEVELS A & B

CELL LEVELS A & B INTERLACED WITH C

CELL LEVELS A THRU C INTERLACED WITH D

CELL LEVELS A THRU D INTERLACED WITH E

CELL LEVELS A THRU E INTERLACED WITH F

Fig. 22e

CELL LEVELS A THRU F INTERLACED WITH G

Fig. 22f

CELL LEVELS A THRU F INTERLACED WITH G

Fig. 22g

CELL LEVELS A THRU H INTERLACED WITH I

Fig. 22h

Scan line with sample points shown with spots.

SCAN LINE SAMPLE

Assume:
1. 256 x 256 point cell size
2. Pond Cell "F" starts in upper left corner of drawing.
3. PQR= Most significant bits in X direction for pond cell in real world co-ordinates.
4. XYZ= most significant bits in Y direction for pond cell in real world co-ordinates.

PHOTOGRAPHIC IMAGE DATA MANAGEMENT SYSTEM FOR A VISUAL SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a photographic image data management system for a visual system, and more particularly for a flight simulator visual system.

Disk based visual image generators have been used for several years. They typically store a digitized aerial image in sections on a disk and use some type of digital scan converter to distort the visual information and present the image to the viewer at the proper perspective. These systems have realistic images because they are based on aerial photographs, but are complex and expensive. One problem is that the aerial photography often must be obtained using a special camera. Another is that in order to provide a real-time simulation, many disks must be used or a lot of preprocessing must be done on the imagery and stored in some type of very large temporary memory.

SUMMARY OF THE INVENTION

An objective of the invention is to improve the performance of disk based image generators, at a relatively low cost, while providing performance which is nearly as good as current expensive systems.

Objects of the invention include the following:

a. It minimizes the amount of image data which needs to be processed at any one instant in time.

b. It allows image detail to be added or deleted gracefully. Images do not "pop" into view or instantly change their level of detail.

c. It eliminates requirements for images to be obtained with special cameras. Standard aerial photographic images can be used.

d. It allows the disk storage device to operate efficiently near its maximum transfer rate without significantly degrading picture quality. This minimizes the number of disk storage devices required.

e. It eliminates problems which typically occur on flying spot scanners when the length-to-width (aspect) ratio is large. The system accommodates any look angle from nadir to horizon.

f. It eliminates the need for preprocessing of the image before a mission is simulated. All images are generated in real time.

g. It minimizes the size of temporary memory and eliminates the requirement for a double buffered memory or video frame memory.

h. The memory organization lends itself to the use of "scene extenders" or repeated photographic patterns. It minimizes total memory requirements where generic areas are acceptable. Insetting of high resolution target areas is accomplished by overlaying the target over top of the background when the cell memory is loaded.

i. The technique is applicable to almost any combination of disk, display resolution, and dynamic image requirements.

The invention relates to a photographic image data management system which can be used to generate an image for visual systems (such as an out-the-window image for flight simulator systems). It comprises a photographic based image generator which creates realistic video images in real time for display on a raster scan monitor or visual display. The system is based on two general principles which could be used separately or in combination to simplify the processing of digitally stored video images. The first principle is the interlacing of the digital information which is stored on a disk. Rather than storing a contiguous picture or sections of a picture, the technique stores a digitized photograph as a series of cells. Each cell contains information which is interlaced in both the horizontal and vertical direction with respect to the preceding and succeeding cell. The second principle is the use of a virtual type of photo memory which allows selective updating of picture information. It simultaneously minimizes the total quantity of digitized data which must be stored at any one instant in time.

One feature of the invention relates to the data interlacing technique which allows detail to be added or deleted gracefully. Image data is interlaced in both horizontal and vertical directions. Only relatively small quantities of data need to be processed at any one instant in time.

Another feature relates to the organization of the temporary photo memory into a type of virtual memory that is grouped in cells. Each cell can be independently updated while the other cells are being accessed for display. Once the cell is updated it can be reassigned to a new address, and the data is automatically interlaced between existing pixels.

BRIEF DESCRIPTION OF THE DRAWINGS

FIGS. 4a-4h, are diagrams showing the interlacing technique of the cells in virtual memory;

FIGS. 6 and 7 show the area covered by one pixel when looking straight down and at a 30 degree look down angle respectively;

FIG. 8 is a diagram showing element size vs. look angle at 2291 ft. altitude;

FIG. 12 comprising FIGS. 12a, 12b & 12c, comprises a diagram showing large generic areas made up from blocks;

FIGS. 21a–21i are diagrams showing how a small irregular shaped pond appears for each level of detail;

FIGS. 22a–22h are diagrams showing how the pond is stored in each level of cell;

TABLES

Figure 1:
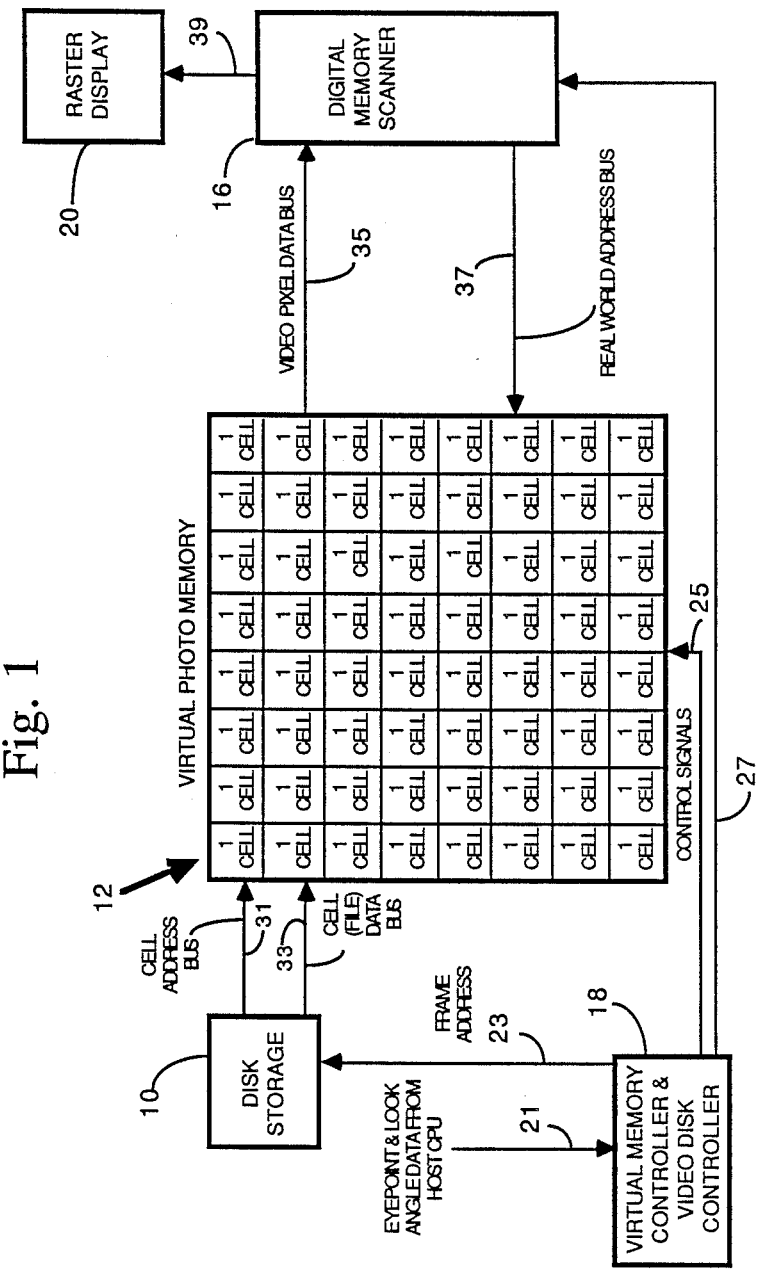
FIG. 1 is basic system block diagram, showing the data management scheme.

The specification includes tables which are related to the drawings as follows:

| Table | Title | Related Drawing |
|---|---|---|
| I | ASSUMPTIONS USED FOR PARAMETERS THROUGHOUT | — |
| II | PIXEL RESOLUTION vs AREA OF COVERAGE | 5 |
| III | Number of Elements for Each Level | — |
| IV | ELEMENT SIZE VS. LOOK ANGLE | 8 |
| V | CELL QUANTITY ESTIMATE | 10 |
| VI | Radius and Element Size for Each Circle | 9 |
| VII | MEMORY ARRAY STORAGE FORMAT | 19 |
| VIII | SCAN LINE EXAMPLE | 24 |

DETAILED DESCRIPTION

I. BASIC PRINCIPLE

The photographic image data management scheme attempts to minimize the problems described in the "Background" section without significantly degrading the performance of the visual image generator. The bottleneck associated with going from one level of detail to the next is eliminated. The technique is suited for single and multi-channel simulator displays, smart bomb or RPV (Remote Piloted Vehicle) simulation, and quick turn-around mission rehearsal using reconnaissance photography.

Some general information on visual image generators for flight simulators may be useful. Typically a cathode ray tube type of display unit with a raster image generator is employed, with typically 30 frames per second. A flight simulator would also usually use infinity optics to give the impression of the scene being far away. For simulation of an aircraft flying in a straight line, within the simulated field of view, the top line of the raster would represent the most distant part of the scene, and the bottom line the nearest. Therefore each pixel in the top line represents a large area on the ground, while each pixel in the bottom line represents a small area.

In the prior art, a unique aerial photograph was prewarped or specially photographed to simulate many general positions and altitudes. Whenever a slightly different position was simulated, the image was again warped to generate the scene from a specific look point. The data was stored as contiguous pictures. As the aircraft moved through the data base and was positioned closer to a different prewarped scene, the entire new scene had to be brought into the image processor to completely replace the old scene. In systems which use ROM memory the entire gaming area needed to be digitized at several resolutions and the entire memory switched as the look point changed from one level of detail to the next.

In the following discussion, typical performance parameters of video equipment and display systems are assumed for purposes of illustration (Table I). The techniques which are discussed are not limited to these specific values and are applicable to almost any combination of display, resolution, and dynamic image requirements. Also, for purposes of illustration, all digitized photographs are assumed to be aerial photos taken looking straight down at the ground. The photos do not allow for vertical relief without also correlating the digitized photographic data with elevation data. A possible implementation of vertical warp is discussed later. The system description in section I ignores elevation

TABLE I
ASSUMPTIONS USED FOR PARAMETERS THROUGHOUT

Ballpark Parameters for a Typical System
The following assumptions are made for the example system.
WORM disk drive:
(Based on MAXTOR RXT-800S)
Data capacity = 800 MBytes
Sustained data transfer rate = 150 KBytes/second
Access time = 1.5 sec max (First file to last)
Average latency = 66-150 ms.
Display:
Assume a 48 degree horizontal by 36 degree vertical field of view
480 active display lines.
Symmetrical horizontal and vertical resolution.
Horizontal elements = 4/3 * 480 = 640 elements.
6.0 MHz display bandwidth.
Photograph:
9" × 9" high resolution aerial photo taken with a mapping camera
18000:1 scale factor
2.25 mile square area covered on each photo.
10 LP/mm resolution.
0.002" pixel size.
0.002" * 18000 = 36" pixel size on real world ground.

Note: Smaller pixel size can easily be achieved by using lower scale factors. This data could be inset into lower resolution surrounding data to achieve high resolution around runways, bomb targets, etc. Low altitude photos would typically be used to obtain this data. They could be digitized for the appropriate final pixel size. Shallow look angles could also be incorporated into high resolution inset areas.

data and vertical warp because the general technique does not require its use. The practical implementation described in section II incorporates an elevation processor which performs the vertical warp. In special cases, photos can be taken at angles other than straight down. Fir example, in the area of a runway, or bomb target, oblique digitized photos can be used to create the illusion of vertical relief and occulting on buildings etc.

The term "disk" is used throughout this explanation to indicate a large digital mass storage area. Typically the disk can be a magnetic or optical disk; however, the technique is not restricted to any particular type of memory storage device. It does require a large storage area which can be accessed rapidly by files in a nonsequential manner. At the present time, a magnetic disk or Winchester may be the most economical choice. Soon however, the WORM optical disk or compact disk ROM will provide a very large data base storage media at a low cost. The implementation discussed in section II is based on a WORM optical disk drive.

FIG. 1 shows the block diagram of a system which incorporates interlaced photographic data and a virtual photo memory. The system comprises a disk storage area 10 which is microprocessor controlled and contains files of digitized aerial photographs in a special interlaced data format. The data from the disk is dynamically stored in a virtual memory 12. The digitized data is accessed by a digital scan converter 16. Note that the disk store 10 can access/load only one cell at a time. The system is controlled by a microprocessor 18 which determines area to be scanned, resolution requirements of that area, and the non-linear scan characteristic.

Figure 2:
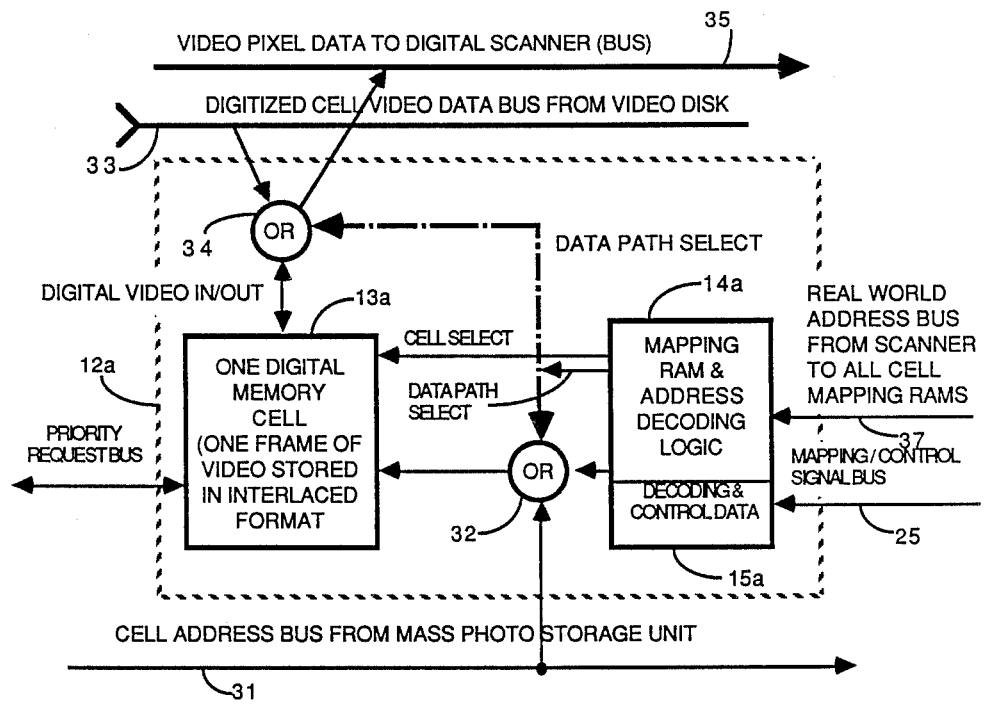
FIG. 2 is a block diagram of a cell (one of many cells)
Figure 3A:
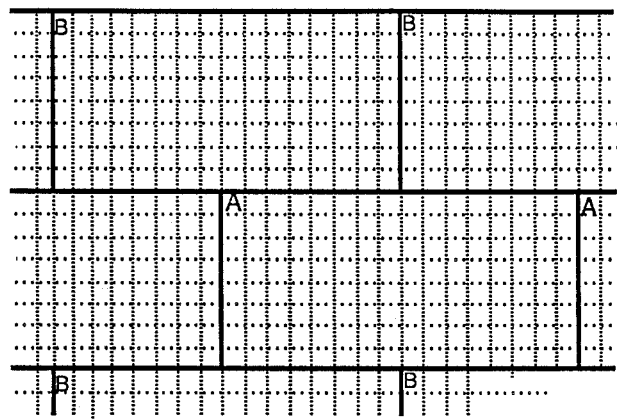
FIG. 3 comprising FIGS. 3a-3h, and FIG. 4 comprising
Figure 3B:
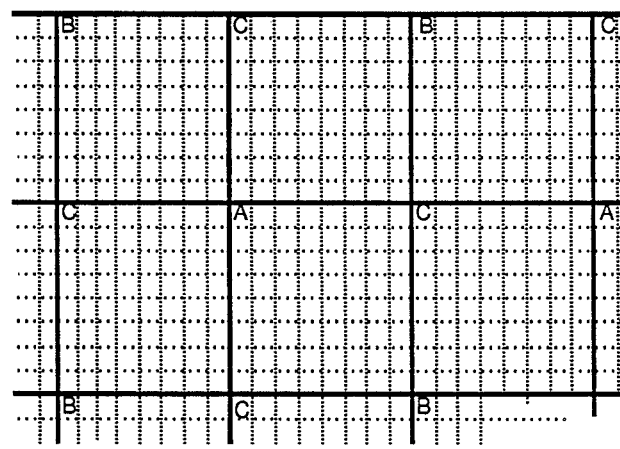
Figure 3C:
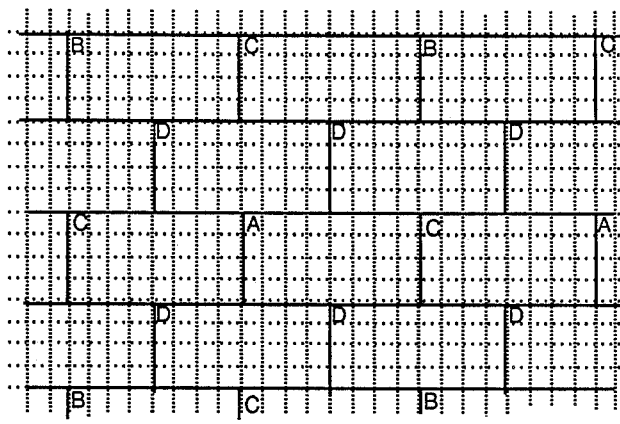
Figure 3D:
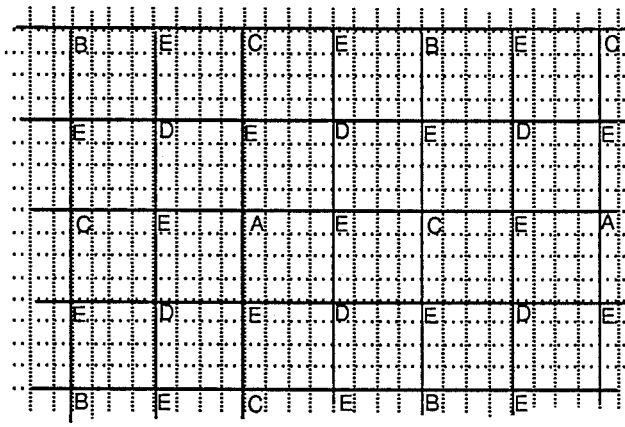

The output of the scan converter is displayed on a raster scan video display 20. FIG. 2 is a block diagram of one cell 12a of the many cells of the virtual photo memory 12. Each cell 12a comprises a video storage memory unit 13a and a mapping RAM unit 14a. The mapping RAMs 14a of all of the cells of memory 12 may be referred to collectively as the mapping RAM 14. Each mapping RAM unit 14a includes address decoding logic circuits, and has associated decoding and control data circuit 15a for one cell. The video storage unit 13a comprises a section of main memory for storing one cell of video digital data at one level of interlaced format. It might for example comprise memory devices for storing 256×256 pixels, with each pixel having eight bits for a black and white display (more for color).

Figure 3H:
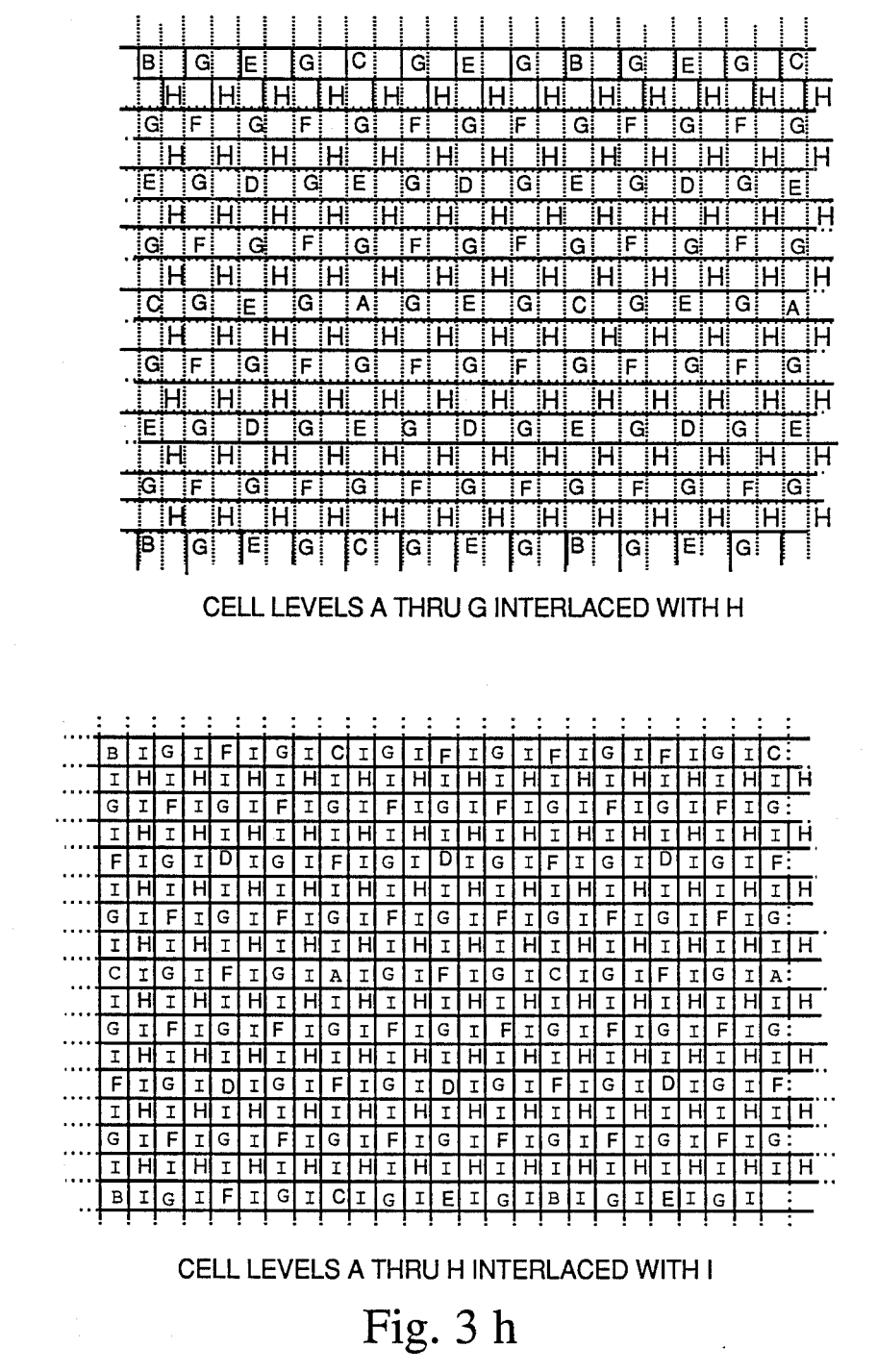

FIGS. 3a thru 3h (and also FIGS. 4a through 4h) show how one high resolution image is stored in several files or cells. The following notes apply to these figures:

1. Lines indicate border of the cell element. The cell element level is shown in the upper left corner.

2. Dots indicate the size of the smallest cell element used in the system.

3. Under normal conditions the cells are allocated so that their density is greater than required by the scan converter. The only time that the observer sees loss of detail is when the mass memory controller falls behind.

higher level cell simply fills in pixels between the existing data points. Pixels labeled with the same letter are stored in the same file on the disk. One file of the data is loaded into one cell of memory when required by the memory controller. There are two versions of the organization of the cells in virtual memory, with version 1 being FIG. 3, diagrams a–h, and version 2 being FIG. 4, diagrams a–h. FIG. 3 (version 1) illustrates how alternate layers (i.e. layers D, F, H, etc.) can be offset by one-half element to minimize spacing between the sampled photo points in both the horizontal and vertical directions. FIG. 4 (version 2) shows a non-offset method of interlacing data which may simplify address decoding and the mapping RAM.

In FIGS. 3a–3h or 4a–4h, the highest resolution data is stored in file "I". File "I" is made up of every other pixel of the original digitized photograph. It is the highest density of data which is stored; however, because it must be stored on a disk whose files each have the same capacity, it covers the smallest area. Table I shows how the level of detail, pixel size, and area of coverage vary for each type of cell. Note that as pixel size decreases, the quantity of pixels/unit area increases and the total area of coverage for one cell decreases.

Figure 5:
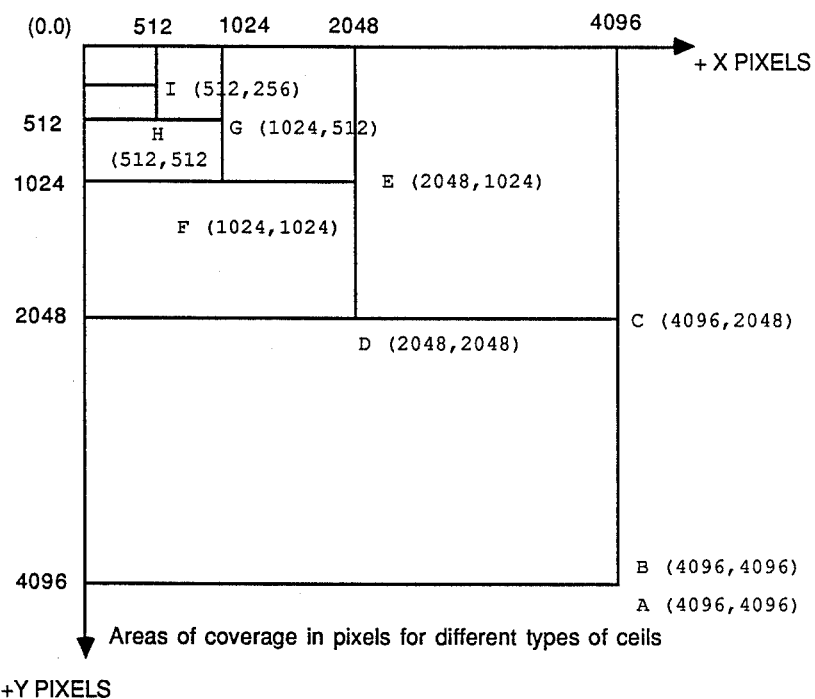
FIG. 5 is a diagram showing how adjacent cells and areas of coverage are related.

Table II and FIG. 5 illustrate how the level of detail is related to the pixel resolution and area of coverage for each type of cell. They illustrate how the entire photograph can be divided into cells each with equal data sizes.

All cells use the same number of pixels. Table II assumes that each cell has 256 horizontal×256 vertical data points for a total of 65,536 (256×256) data points. In the virtual memory of FIGS. 1 & 2, any of the memory cells can be allocated to store any level of detail, i.e. level A through level I. This is done so that when an area or cell of any level of detail (A through level I) is no longer required, it can be reallocated to store a different area at any level of detail.

TABLE II

PIXEL RESOLUTION vs AREA OF COVERAGE
(Refer to the interlace technique of FIG. 4)

| Level of Detail | # of Pixels Covered by each Data Point (H × V) | # of Pixels Covered From One Data Point to The Next (H × V on ground) | Pixels Covered on Ground (H × V)* | Area Covered by 1 Cell (H × V feet) |
|---|---|---|---|---|
| A | 16 × 16 | 16 × 16 | 4096 × 4096 | 12288 × 12288 |
| B | 16 × 8 | 16 × 16 | 4096 × 4096 | 12288 × 12288 |
| C | 8 × 8 | 16 × 8 | 4096 × 2048 | 12288 × 6144 |
| D | 8 × 4 | 8 × 8 | 2048 × 2048 | 6144 × 6144 |
| E | 4 × 4 | 8 × 4 | 2048 × 1024 | 6144 × 3072 |
| F | 4 × 2 | 4 × 4 | 1024 × 1024 | 3072 × 3072 |
| G | 2 × 2 | 4 × 2 | 1024 × 512 | 3072 × 1536 |
| H | 2 × 1 | 2 × 2 | 512 × 512 | 1536 × 1536 |
| I | 1 × 1 | 2 × 1 | 512 × 256 | 1536 × 768 |

Notes for Table II:
*Assumes a cell size of 256 × 256 pixels.
Assumes a minimum pixel size of 36" × 36" for example only.

4. In the example, it is likely that levels A thru C would always be in memory due to their low memory space requirements.

5. Highest letter has highest priority.

Each cell is stored in one file on the disk. Each dark block represents one element of a cell. The cells are interlaced so that higher resolution data can be added or deleted gracefully. The higher the letter, the higher the resolution and the higher its priority. Note however, that even the original low resolution background data, contained in cells "A" through "C", are still included in the highest resolution image shown in FIG. 3h. Each The same technique can be used for any number of levels of cells. For example, Levels "A" through "K" could be used with a 18"×18" pixel size. The size of the smallest pixel and the number of levels of cells depends upon the visual system requirements.

Figure 4A:
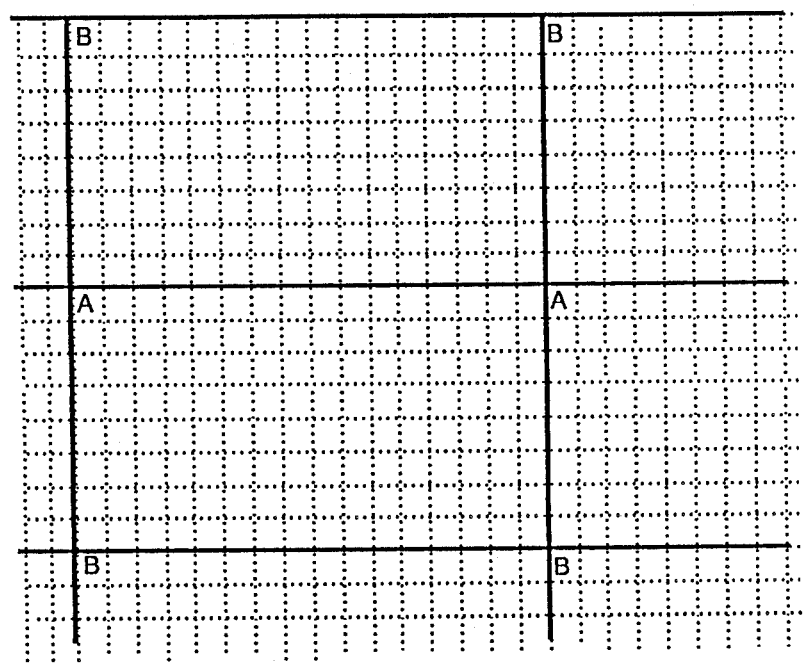
Figure 4B:
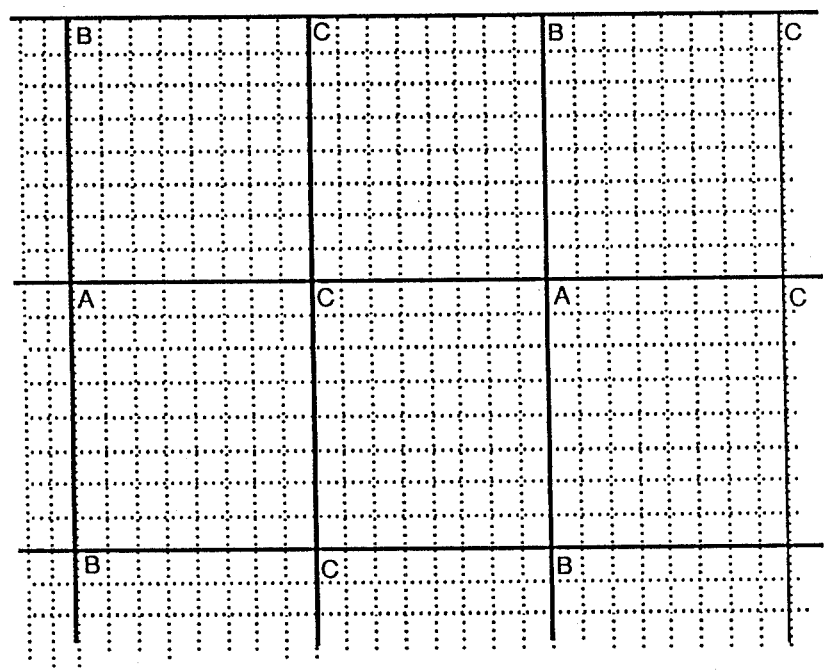
Figures 4G, 4H:
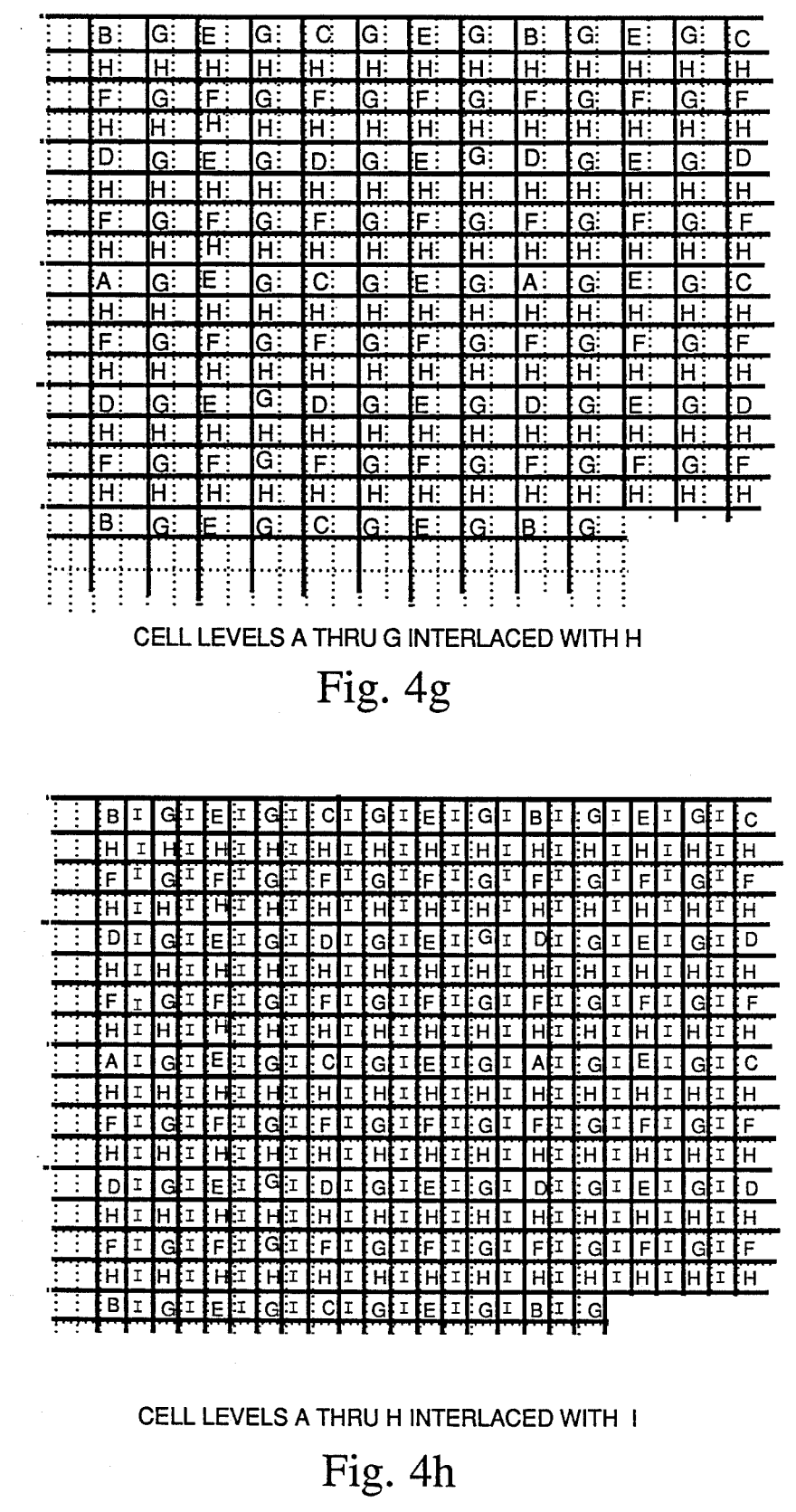

Analysis of FIGS. 3, 4 and 5 shows that each cell of the virtual memory comprising 256×256 elements may be considered in groups of 16×16 elements, with each group occurring 16 times horizontally and 16 times vertically. In FIGS. 3a–3h and 4a–4h, the number of elements for each level in each 16×16 group is shown in Table III.

TABLE III

| FIG. | A | B | C | D | E | F | G | H | I |
|---|---|---|---|---|---|---|---|---|---|
| 3a or 4a | 128 | 128 | — | — | — | — | — | — | — |
| 3b or 4b | 64 | 64 | 128 | — | — | — | — | — | — |
| 3c or 4c | 32 | 32 | 64 | 128 | — | — | — | — | — |
| 3d or 4d | 16 | 16 | 32 | 64 | 128 | — | — | — | — |
| 3e or 4e | 8 | 8 | 16 | 32 | 64 | 128 | — | — | — |
| 3f or 4f | 4 | 4 | 8 | 16 | 32 | 64 | 128 | — | — |
| 3g or 4g | 2 | 2 | 4 | 8 | 16 | 32 | 64 | 128 | — |
| 3h or 4h | 1 | 1 | 2 | 4 | 8 | 16 | 32 | 64 | 128 |

FIG. 5 is a diagram showing how the area covered as given in Table I is related to the basic pixels. FIG. 5 illustrates the area on the ground covered by each type of cell. The area is defined in pixels and assumes coordinate (Ox, Oy) is located at the top left corner. This shows level I in the upper left as covering a 512×256 pixel area which corresponds to a 1536'×768' area on the ground for a 3'×3' pixel size. The areas of coverage for each lower cell level is one half the previous coverage area.

When images are played back, the density of the original photographic data needed in any one area of the display varies. For any given altitude of the eyepoint, the highest photographic density must be reproduced when the look angle is straight down, perpendicular to the earth. When looking straight down, the footprint of area which is seen is its smallest, as shown in FIG. 6. When looking out toward the horizon, the data density of the original photographic data needed is much less; however, the area which the footprint covers is much larger.

The diagram in FIG. 6 shows a triangle with the eyepoint at the apex and one element (pixel) on the ground being represented by the bottom side of the triangle, shown as three feet. The vertical side of the triangle at a right angle to the ground represents the altitude. The display element size is equal to a 36 degree vertical FOV (field of view) divided by 480 active lines, which is 0.075 degrees/element. Three feet divided by the altitude is equal to tan (0.075 degrees). The minimum altitude looking straight down without a high resolution insert is 2300 feet.

TABLE IV

ELEMENT SIZE VS. LOOK ANGLE
ALT = 2291 ft. based on a 0.075 degree/element display and a 36" real world pixel size

| DEGREE FROM NADIR | ELEMENT SIZE (FEET) | DEGREE FROM NADIR | ELEMENT SIZE (FEET) | DEGREE FROM NADIR | ELEMENT SIZE (FEET) |
|---|---|---|---|---|---|
| 0* | 3.000 | | | | |
| 1 | 3.001 | 31 | 4.086 | 61 | 12.79 |
| 2 | 3.004 | 32 | 4.175 | 62 | 13.65 |
| 3 | 3.008 | 33 | 4.269 | 63 | 14.59 |
| 4 | 3.015 | 34 | 4.369 | 64 | 15.65 |
| 5 | 3.023 | 35 | 4.475 | 65 | 16.84 |
| 6 | 3.034 | 36 | 4.588 | 66 | 18.19 |
| 7 | 3.046 | 37 | 4.708 | 67 | 19.71 |
| 8 | 3.060 | 38 | 4.836 | 68 | 21.45 |
| 9 | 3.076 | 39 | 4.973 | 69 | 23.44 |
| 10 | 3.094 | 40 | 5.118 | 70* | 25.74 |
| 11 | 3.114 | 41 | 5.273 | 71 | 28.41 |
| 12 | 3.136 | 42 | 5.439 | 72 | 31.54 |
| 13 | 3.161 | 43 | 5.616 | 73 | 35.25 |
| 14 | 3.188 | 44 | 5.805 | 74 | 39.67 |
| 15 | 3.217 | 45* | 6.008 | 75 | 45.00 |
| 16 | 3.248 | 46 | 6.225 | 76* | 51.53 |
| 17 | 3.282 | 47 | 6.459 | 77 | 59.62 |
| 18 | 3.318 | 48 | 6.710 | 78 | 69.83 |
| 19 | 3.357 | 49 | 6.981 | 79 | 82.96 |
| 20 | 3.399 | 50 | 7.272 | 80* | 100.2 |
| 21 | 3.444 | 51 | 7.587 | 81 | 123.6 |
| 22 | 3.492 | 52 | 7.928 | 82 | 156.3 |
| 23 | 3.543 | 53 | 8.298 | 83* | 204 |
| 24 | 3.597 | 54 | 8.699 | 84 | 278 |
| 25 | 3.655 | 55 | 9.136 | 85* | 400 |
| 26 | 3.716 | 56 | 9.613 | 86* | 628 |
| 27 | 3.781 | 57 | 10.13 | 87* | 1123 |
| 28 | 3.851 | 58 | 10.71 | 88* | 2559 |
| 29 | 3.925 | 59 | 11.33 | 89** | 10647 |
| 30 | 4.003 | 60* | 12.03 | | |

*Indicates angles where the previous element size doubles. For example, if a 3.000 foot element size is required at 0 degrees, a 6 foot element size is needed at 45 degrees. A 12 foot element size is needed at 60 degrees, etc.

TABLE V

CELL QUANTITY ESTIMATE

| Element Size (ft) | Close Angle (deg) | Close Range (ft) | Far Angle (deg) | Far Range (ft) | Element Quantity (ft) |
|---|---|---|---|---|---|
| 1536 | 87 | 43714 | 88 | 65605 | 3186 |
| 768 | 86 | 32762 | 87 | 43714 | 4460 |
| 384 | 85 | 26186 | 86 | 32762 | 8258 |

TABLE V-continued

| | | CELL QUANTITY ESTIMATE | | | |
|---|---|---|---|---|---|
| Element Size (ft) | Close Angle (deg) | Close Range (ft) | Far Angle (deg) | Far Range (ft) | Element Quantity (ft) |
| 192 | 83 | 18658 | 85 | 26186 | 28768 |
| 96 | 80 | 12992 | 83 | 18658 | 61130 |
| 48 | 76 | 9188 | 80 | 12992 | 115045 |
| 24 | 70 | 6294 | 76 | 9188 | 244373 |
| 12 | 60 | 3968 | 70 | 6294 | 520750 |
| 6 | 45 | 2291 | 60 | 3968 | 915980 |
| 3 | 0 | 0 | 45 | 2291 | 1832139 |
| | | | | TOTAL | 3734089 |

Assume a 256×256 data point cell. 57 cells @ 65536 pixels/cell are required to completely fill the virtual memory so that any look angle can be generated by the scanner for a given eyepoint. Note that quantity is independent of altitude. For example, if the altitude was twice as high, the element size would double, the ranges would double, but the element quantities would remain the same.

Since 57 cells are required, a 64-cell memory would be a typical virtual memory size. The extra cells are used to preload areas and/or higher levels of detail as the eyepoint moves toward them. The cell data would be ready ahead of time before the scanner called for it.

The diagram in FIG. 7 shows the situation for a 3-foot element size when looking at a 30 degree depression angle, analyzed as follows:

ALT = x tan 30.075 degrees
ALT = (x+3) tan 30
x tan 30.075 = (x+3) tan 30
0.57910 x = 0.57735 x + 1.73205
x = 990 ft.
ALT = x tan 30.075 = 573 ft.

Thus the minimum altitude when looking at a 30 degree depression angle without a high resolution insert is 573 feet.

Figure 9:
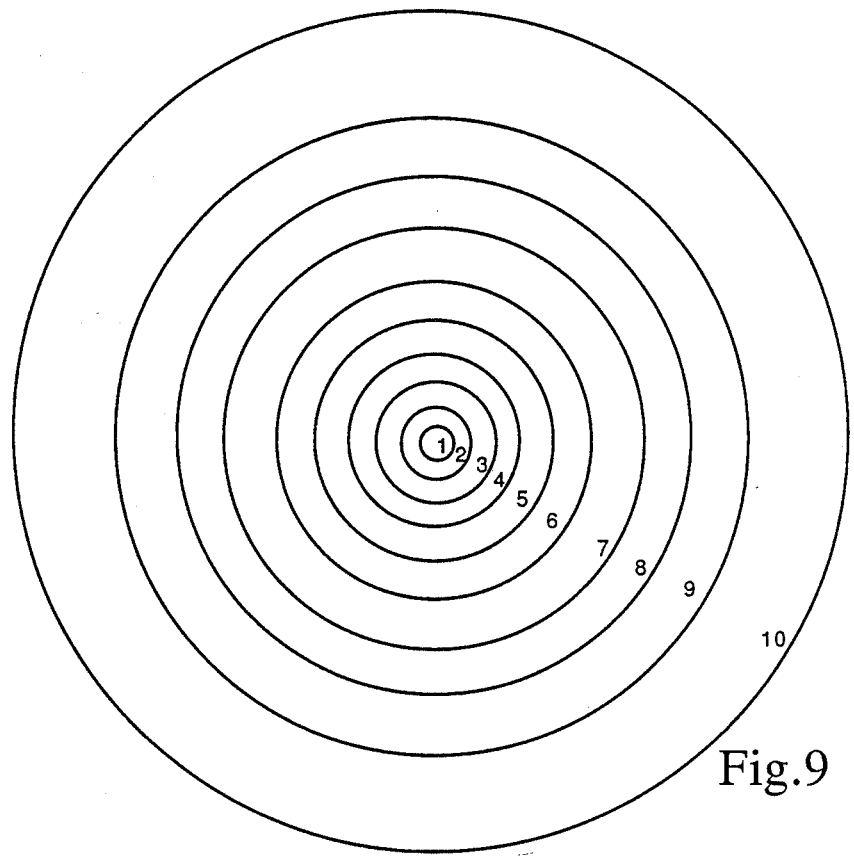
FIG. 9 is an element size map of the ground.
Figure 10:
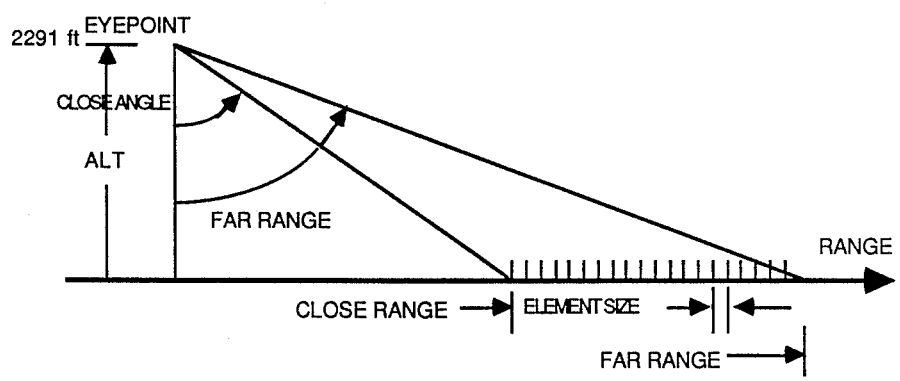
FIG. 10 is a diagram showing cell quantity estimate.

Assume that a typical display covers a 48 degree wide by 36 degree vertical field of view. Each line of a raster scan display represents an equal vertical angle. If there are 480 active lines on a 36 degree vertical field of view display, then each line subtends 0.075 degrees/line vertically. In a similar manner, if the display has 640 pixels spaced across a 48 degree wide field of view, each element subtends 0.075 degrees/element horizontally. FIGS. 8–10 with Tables IV & V illustrate how the resolution requirements and footprint areas change as a function of look angle. FIG. 8 with Table IV shows how the element size is a function of the look angle at an altitude of 2291 feet. An altitude of 2291 ft. is chosen for illustration because it is the altitude at which a 0.075 degree element would cover 3 feet on the ground. Each pixel is a 3-ft. real world square size. FIG. 9 is a map of the ground to show element size. This figure is derived from the data in Table IV. The center is directly below the observer. The elements sizes and radius numbers are scaled for an eyepoint altitude of 2291 ft. for illustration. Note that even though the observer can only look in one particular area due to display field of view limitations, the virtual memory stores data for any look angle. This permits the scanner to instantly provide any look angle for snap rolls, spins, etc. The diagram shows ten circles from #1 looking straight down to #10 the farthest away. The radius and element size for each circle are shown in Table VI.

TABLE VI

| Circle | Radius | Element Size |
|---|---|---|
| 1 | 2291' | 3' |
| 2 | 3968' | 6' |
| 3 | 6294' | 12' |
| 4 | 9188' | 24' |
| 5 | 12992' | 48' |
| 6 | 18658' | 96' |
| 7 | 26186' | 192' |
| 8 | 32762 | 384' |
| 9 | 43714' | 768' |
| 10 | 65605' | 1536' |

FIG. 10 with Table V shows a cell quantity estimate at an altitude of 2291 feet.

The element map shown in FIG. 9 illustrates how the resolution required by the display varies as a function of distance from the look point. The small circle #1 represents the area below the observer. For the example 0.075 degree element, the area inside circle #1 needs to be represented to a 3-foot resolution or element size. Each succeeding circle covers a larger area, and the resolution requirement drops by a factor of 2. The 2:1 ratio between element sizes is chosen to be compatible with the 2:1 horizontal and vertical interlaced data pixel size.

During image generation, there is a limitation on the quantity of data which can be accessed by a disk. This limitation is due to the baud rate of the disk and the access time to reach the specific files which contain the required data. By storing information in the proposed interlaced format, the number of files which need to be read from the disk is minimized. The density and resolution of the stored cells of digitized data closely match the way they will be required to create a desired visual image.

Assume that the visual system is displaying a 30 degree look down angle as the aircraft or eyepoint is travelling at a constant altitude. Image data is first brought into the picture at the top of the screen (near the horizon) at a low resolution. As the aircraft approaches the area which used to be far away, more detail can be resolved in that area. The visual system simply brings in the interlaced data from the disk to fill in the detail between the previously accessed data. There is no need to bring in a lot of unneeded detail. When the data is required, only the fill-in data needs to be accessed. The previous low resolution data, which is interlaced with the higher resolution detail, is already stored in memory and does not need to be reaccessed. FIGS. 3a–3h (or 4a–4h) illustrate how the resolution can be increased/decreased by adding/deleting an interlaced cell.

In a different scenario, suppose the aircraft is flying at a high altitude and descends. As his altitude decreases, the amount of detail which can be resolved improves. The interlaced data can be brought in to fill in the required detail as the aircraft descends. On the other side of the problem, high detail is no longer required far from the eyepoint because the look angle is more shallow and pixels required per unit area is down. The cell which previously contained this information can be written over by new cell data and reallocated by the virtual memory controller. Note that even though the high detail cells have been deleted, the lower resolution background information is still stored in active cells and can be accessed by the scan converter.

Figure 22A:
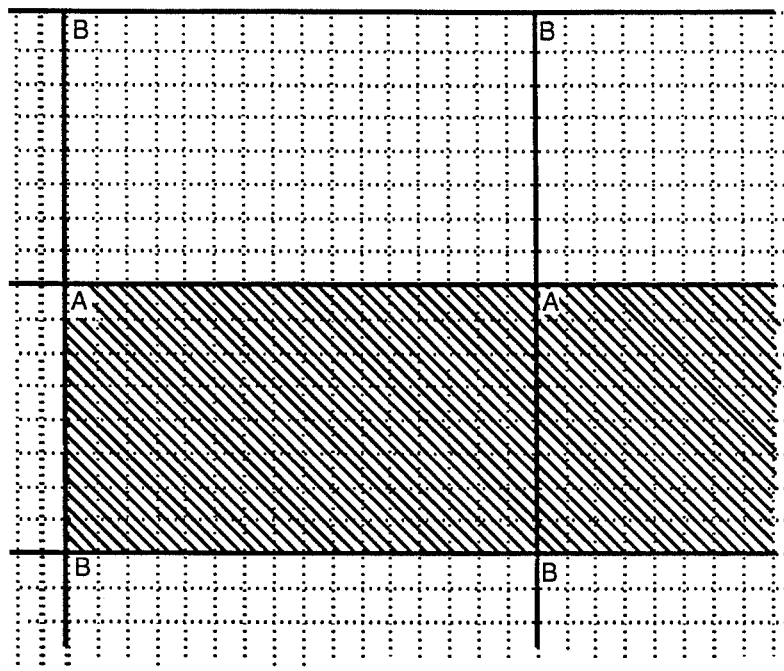
Figure 22B:
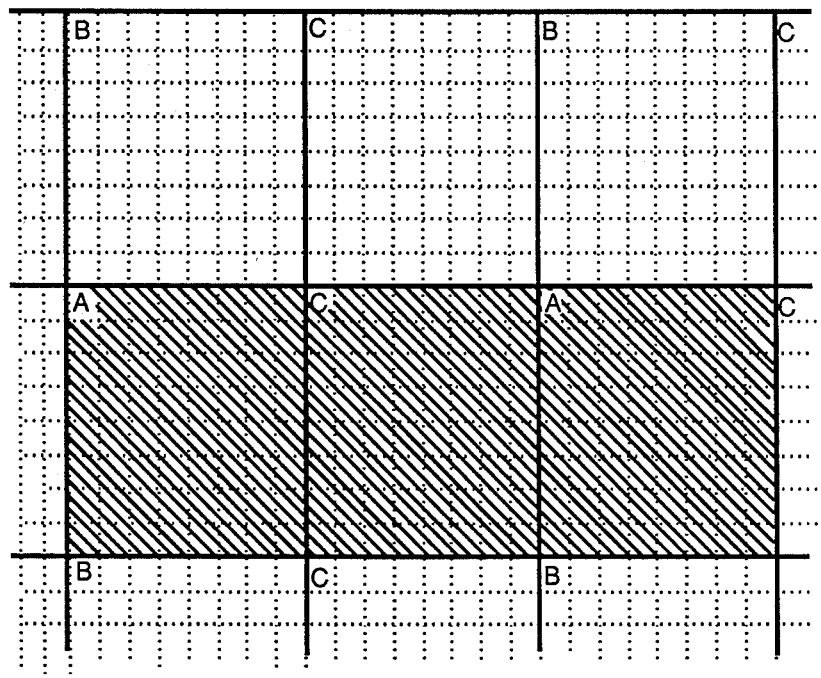
Figure 22C:
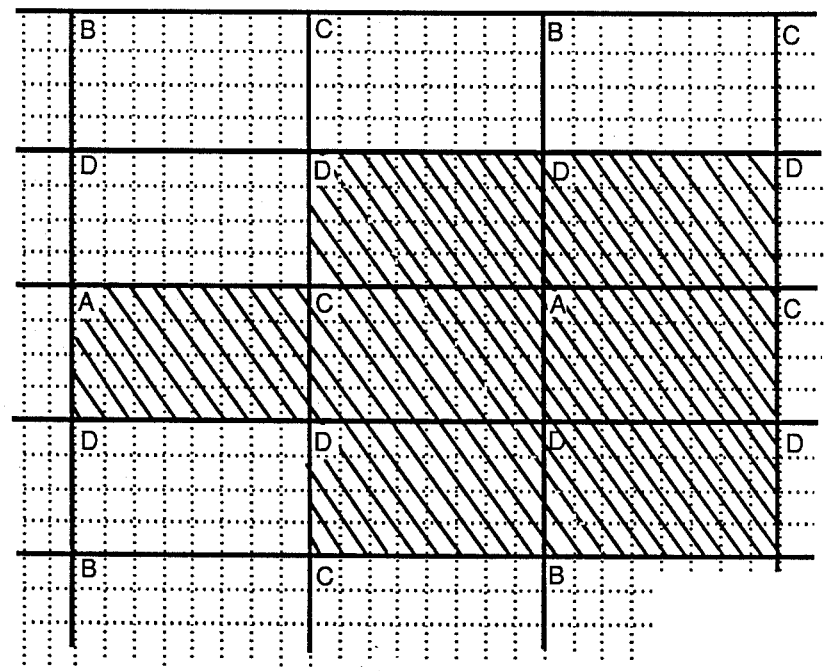
Figure 22D:
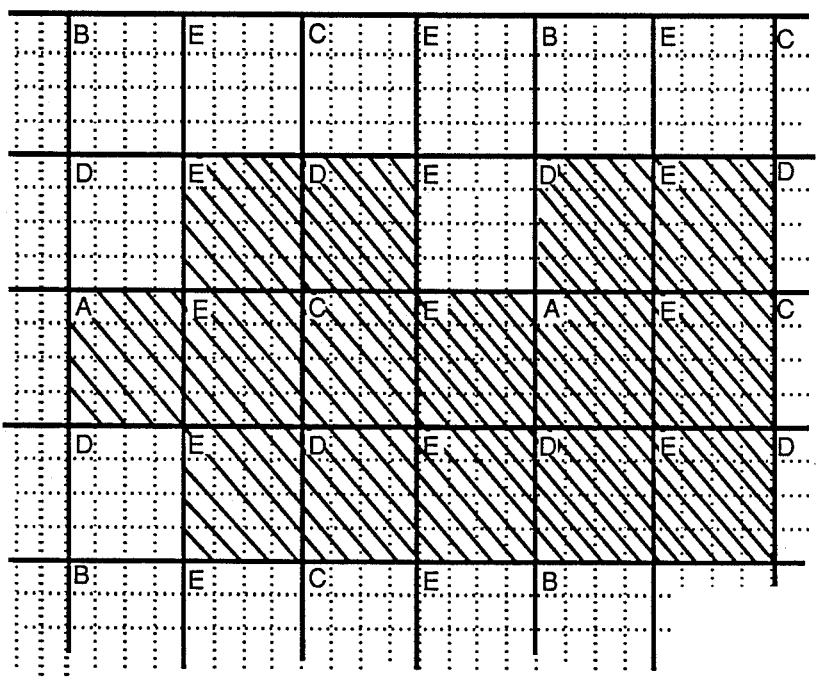
Figures 22G, 22H:
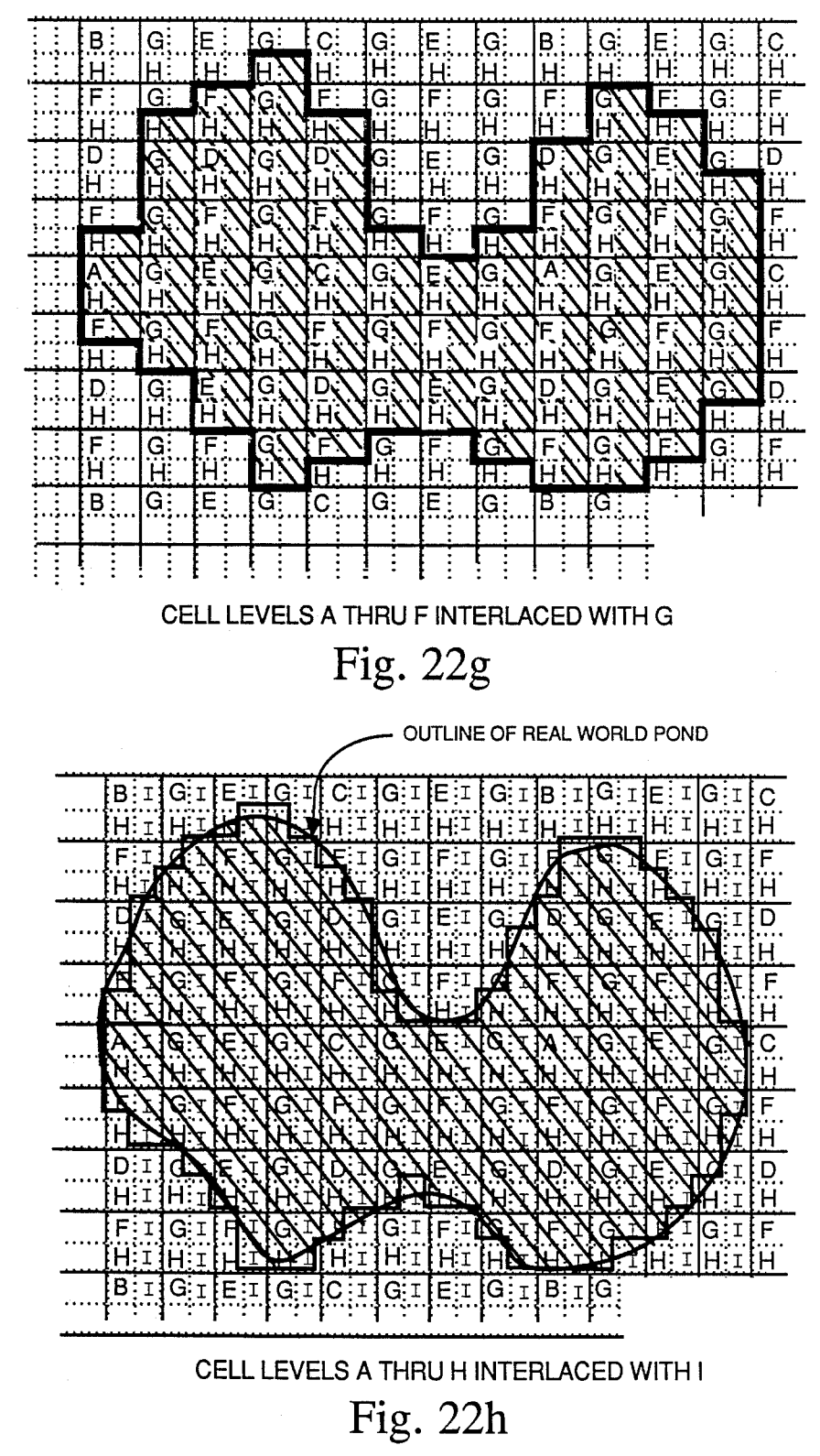

The total quantity of data which can be brought into the virtual photo memory for processing by the scan converter is a function of the quantity of disks and their access times. Suppose only one disk was used to minimize the image generator costs. During quick maneuvers, it is likely that more high resolution data would be required by the image generator than could be supplied by the disk. In this case the disk would temporarily fall behind. In most cases this could be easily accommodated because the lower resolution is data already in memory and is being processed by the image generator. The amount of detail which can be resolved (resolution) is temporarily down in a certain area of the display screen, but will be filled in as soon as the disk catches up. For example, in section III below "EXAMPLE WITH A POND", the pond may look like FIG. 22e rather than FIG. 22f until the disk catches up. The utilization of the disk can be maximized and the quantity of disks required can be minimized by allowing the image detail to decrease somewhat on occasion.

Another tradeoff which can be made with this system is to adjust the size of active video memory which is available to the scan converter. By increasing the size of the video memory, the disc can actually load higher resolution cells ahead of time so that they will already be in memory when required by the scan converter. The larger the video memory, the fewer disks and the less often loss of detail will occur.

Figure 11:
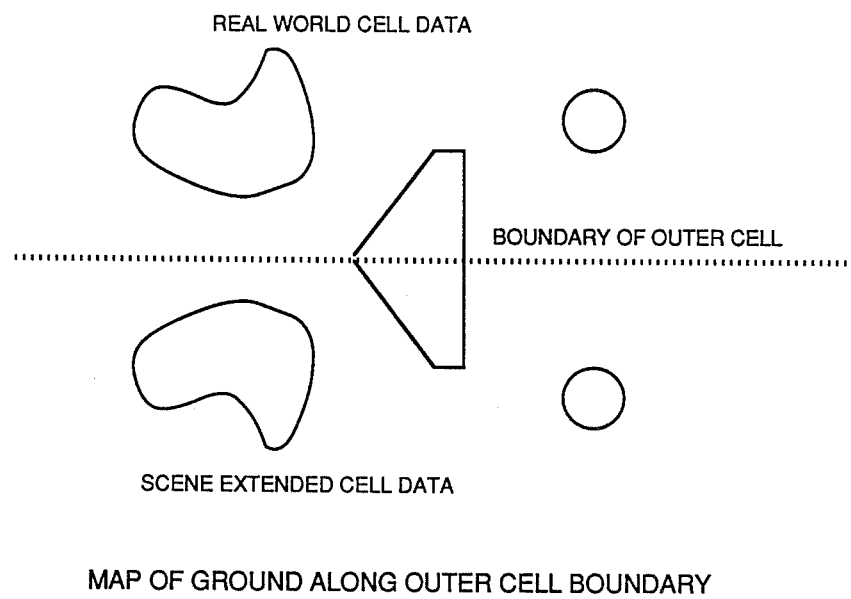
FIG. 11 is a diagram showing the use of a scene extender.

This photographic image storage technique lends itself to use with a digital equivalent of scene extenders (mirrors) used on old camera model systems. The "scene extenders" are placed along borders of cells which are even binary multiples of cells away from each other (see FIG. 11). This technique is useful when flying over generic areas like the farmlands of Ohio or the Kansas plains. As the data is read from video memory and placed into cells, the virtual memory controller simply reverses the address counters so that the data is read into the cells backwards. Once the scene extended data is stored in a cell, the scan converter processes it just like any other cell data. The gaming area has essentially been increased without any additional data storage or expense of digitizing large generic gaming areas.

VIRTUAL PHOTOGRAPHIC MEMORY

FIGS. 1 and 2 which have already been described, show one possible implementation of a virtual photographic memory. The virtual memory 12 is organized in cells, such as cell 12a in FIG. 2, each of which contain the amount of digitized data which can be read from one file of the disk. The minimum amount of photographic memory would be the amount required by the scan converter 16 to fill the display 20. In practice, however, a much larger memory 12 is required. The larger memory is needed so that the additional detail and/or areas outside the field of view are available for immediate use if needed. FIG. 10 and Table V indicate a memory size computation for a typical image generator and display system.

There are two independent data and address paths for the virtual photograph memory 12 (see FIG. 2). The first, comprising a call address bus 31 and a cell data bus 33, is controlled by a microprocessor 18 and directs the digitized data from the disk into memory. Only one cell of memory 12 can be accessed at any one time by the disk store 10. An entire file of information is stored in one cell.

The second set of address and data paths, comprising a real world address bus 37 and a video pixel data bus 35, is controlled by the digital scan converter 16 via the mapping RAM 14. As cells of data are entered into memory 12 by the virtual memory controller 18, they are placed in unused or no-longer-needed cells. The controller 18 simultaneously loads the mapping RAM 14 with appropriate decoding and control data 15a via the mapping and control signal bus 25 so that the scan converter 16 knows where to go to find the data. This technique is analogous to virtual memories used in large computers to store data and instructions for rapid access by the CPU.

On startup, the virtual memory cells are initially loaded from the disk photo mass storage area 10. The worst case file access time is less than 1.5 seconds. Once the area on the disk is located, the other files would typically be stored very close to it. For a 64-cell memory, using two WORM drives, the initial load would take about 1.5 seconds+(64 cells/2 disks)*(65536 bytes/cell)*(1 sec./150KByte) seconds or about 15.5 seconds. Note that no additional time is required to access files because of the ping-pong configurations of the two disk drives. Once the memory cells are initially located, they can be dynamically allocated in real time by the virtual memory controller 18.

DIGITAL SCAN CONVERTER

The digital scan converter 16 works like a flying spot scanner, except that instead of scanning a photograph, it is generating addresses of digitized data which are required to create the picture. The appropriate digitized data is converted to an analog signal for display by the visual system. The big advantage of this scanner is that it is working through the virtual cell memory and can access the desired area at the appropriate resolution. A flying spot scanner is limited by the aspect ratio of the scanning CRT, by the scale size of the photograph, and magnification of the imaging lens system. When the look angle is shallow, the footprint aspect ratio becomes extremely long and narrow; thereby limiting the horizontal resolution which can be achieved by the flying spot scanner. The virtual memory, working in conjunction with the interlaced photographic data cells, does not suffer from this problem. The digital scan converter can simultaneously access photographic data appearing near the horizon at a low resolution, and photographic data appearing near the nadir at a high resolution. The photographic data which is available to the scanner matches the requirements of the image generator.

DATA BASE PREPARATION

The data base itself is not the subject of this discussion, however, a brief description of how it can be created and stored is outlined here for illustration purposes.

The simplest data base generation can be done by starting with serial photographic negatives. These are typically taken looking straight down on the earth using a high resolution 9"×9" mapping camera. The area covered by each adjacent photograph is overlapped so that the desired gaming area is covered completely. This is the type of photo which is typically taken for mapping purposes by the U.S. Geological Survey and others. Each photo is digitized using a scanner such as an Optronics photo digitizer. The digitized pixels are formatted into cells by the computer and stored directly into a writable mass storage device such as a Winchester disk or WORM optical disk. If a non-writable mass storage media, such as a CD ROM, is used; an additional step is required to master the disk.

Assuming a 3' pixel, a 500 megabyte (about the size of a CD ROM) mass storage area would be needed to cover an 11 mile square area (i.e., 121 square miles). The image data management scheme is ideally suited for use with repetitive blocks of terrain areas. A small number of different photos can be arranged to create a large generic area. In FIG. 12, only two different patterns are used to create a rather large generic area. Each individual block can be stored by a cell in eight different orientations. The cells can be read from the mass storage media and stored in the cell memory using different addressing techniques to create the rotated generic blocks.

The cellular concept also can accept inset high resolution target areas. A two-step cell load stores the generic block first. The pixels covered by the insert are loaded second; the target area overlays the background. After the insert is loaded, the cell is released for use by the scanner in the normal manner. The high resolution target area is seen on top of the background because it is assigned a higher priority level.

Figure 13:
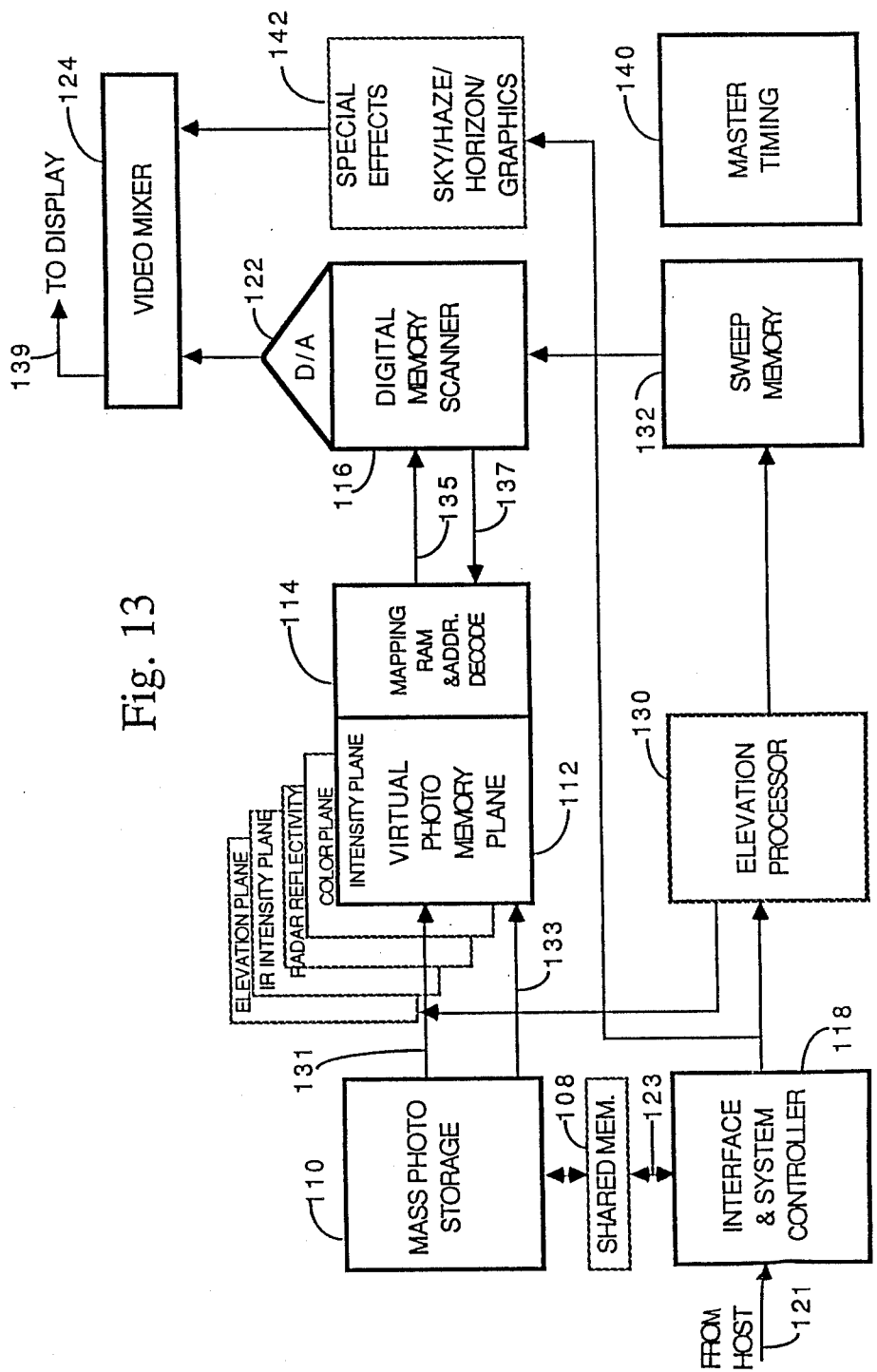
FIG. 13 is a system block diagram of a practical system.

The interlaced data base cells also are ideally suited for use with DTED (digital terrain elevation data). DTED data is only available and necessary at relatively widely spaced points. The DTED data spacing can be correlated to one of the cell resolutions (see FIG. 3a–3h or 4l–4h) during data base generation. A small separate cell memory (elevation plane of virtual photo memory 112 in FIG. 13) can be used with the system to store DTED (FIG. 13). The closest elevation information and the look angle is used by the scanner as it creates the addresses for the virtual cell memory. A vertical warp is generated in this way.

SUMMARY

A special photographic interlacing technique combined with a virtual photographic memory can be used to improve performance of disk-based image generators. The system can be produced for a relatively low cost and provide performance which is nearly as good as current expensive systems. Existing aerial photography is used in most cases. The quantity of disk machines is reduced and photographic preprocessing is eliminated due to an increased efficiency in data base management.

II. IMPLEMENTATION

The purpose of this section is to show how the idea for the "Image Data Management Scheme" described in part I could be used to implement a practical low-cost visual system. It is designed toward a typical single-channel 36 degree by 48 degree field of view raster display running at 525 lines per frame. The components and subsystems which have been selected are commercially available today. The implementation described below is a practical one and is certainly not the only way to construct the data base management scheme. The basic scheme is flexible and can adapt to or be optimized for specific applications. The system is designed with expansion in mind. For example, the unused priority levels in the cell memory are ideally suited for the addition of targets, moving models, cloud banks, specific geographical features overlaid on top of generic backgrounds, etc.

The block diagram in FIG. 13 shows the basic building blocks for the image generator, with optional blocks shown with dashed lines. It comprises:

Mass Photo Storage 110

One or more WORM optical disks and controllers which hold the digitized photographic gaming area in cell format.

Virtual Photo Memory 112

The heart of the system is a virtual photo memory. It stores the digitized photographic data base cells which are required to process any look angle at the current position. This cell memory is stored in a unique interlaced format.

The diagram shows the memory 112 with several planes. The intensity plane is the principal one and is required. Next is a color plane which would be needed for a color display. Infrared and radar reflectivity memory planes are only required if it is necessary to instantaneously switch the display between EO (electro optics), IR (infrared), radar, etc. Typically the single plane memory could be loaded with either EO, IR or radar as appropriate; with the corresponding photo data base disk loaded on the drive prior to use.

Interface & System Controller 118

A microprocessor card which acts as an interface between the host simulator and the image generator. It calculates the sweep memory parameters if no vertical warp is used.

Shared Memory 108

(Optional) A shared memory 108 may be used if two disk drives are used. It allows each disk drive to know what data has been transferred and what files need to be transferred, as explained below under "Mass Photo Storage".

Elevation Processor 130

(Optional) The elevation processor performs the matrix operations which are used to give the image vertical relief. The elevation processor warps the photographs in small sections.

Sweep Memory 132

The sweep memory stores the array of coordinates and scan slopes which are required by the digital memory scanner.

Digital Memory Scanner 116

The scanner is a card which takes the coordinates and scan slopes from the sweep memory, accesses the virtual photo memory, and assembles the data into a digitized video picture. A D/A converter 122 is used to convert the digital pixels into video.

Master Timing 140

The master clock card generates video sync signals and supplies timing pulses to the various subsystems.

Special Effects 142

(Optional) The special effects card generates video such as sky, haze, horizon and any special graphical characters such as HUD information.

Video Mixer 124

The video mixer combines the photographic images with the special effects. It also adds the video sync and blanking pulses. The output can be displayed on a raster scan video display subsystem.

The block diagram is one possible implementation of the basic virtual cell memory concept. It represents an efficient integrated approach to generation of a photo-based image in real time.

Block Breakdown

Several of the blocks which were described in the previous paragraph are detailed below.

Mass Photo Storage

Figure 14:
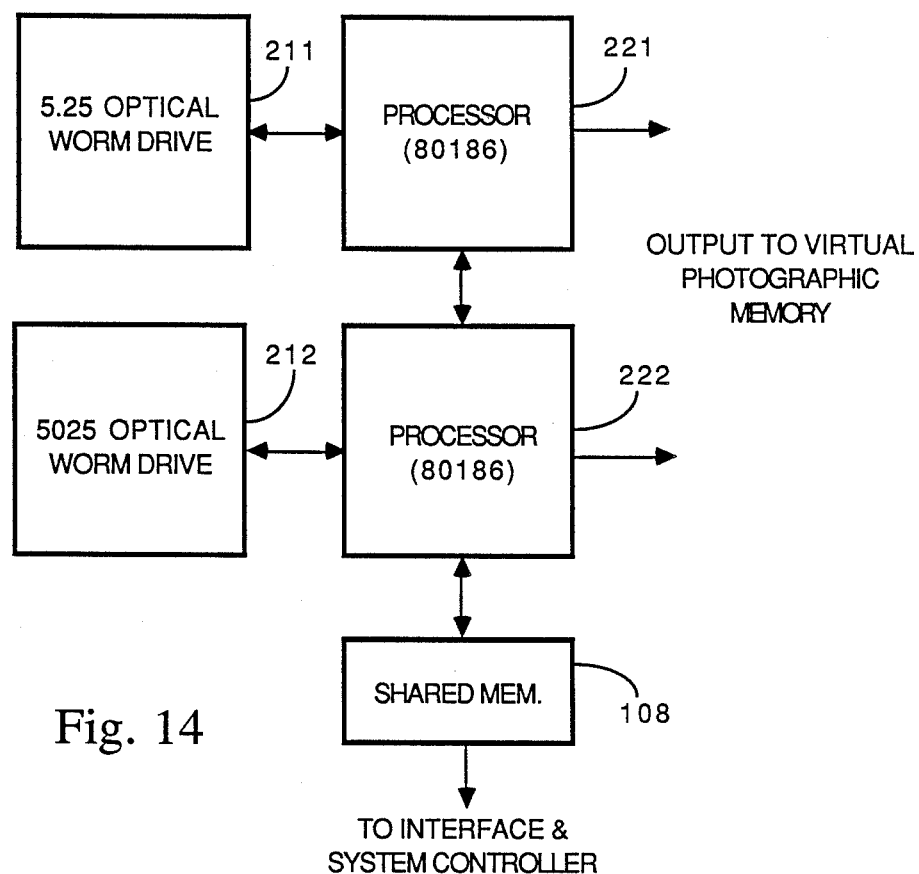
FIG. 14 is a block diagram of a mass photo storage unit for the system of FIG. 13.

The mass photo storage 110 requires a large storage area which can be rapidly accessed by files in a non-sequential manner. The CD ROMs are developing rapidly and are to a point where they could be used. Cost of these devices is declining and availability is improving. The problem associated with their use is the high cost of disk mastering which can run in the $10K ballpark. Since the application is low volume, a WORM drive (Write Once Read Many Times) is well suited. Data bases can be changed or updated by making a new disk and incur only the cost of the medium (only $200) not the mastering cost. Turnaround time is also reduced because the entire task can be done in-house. A good candidate for the 5.25" optical WORM disk drive is Maxtor's RXT-800S which holds about 800 MBytes of data on a double-sided disk. It uses the SCSI (Small Computer System Interface) bus which is commonly used on CD ROMs, Winchester drives, and PCs. Changes to a different drive can be easy at a later date because the SCSI is a popular interface. The mass photo storage block diagram in FIG. 14 shows two WORM drives 211 and 212 and their associated controller and microprocessor cards 221 and 222 working in a ping-pong fashion. (The controllers 221 and 222 may be type 80186 ICs by PC Tech X16B.) This arrangement allows the one unit to be accessing the data while the other is transferring its data to a memory storage cell in the virtual photographic memory 112. A shared memory 108 allows each disk drive to know what data has been transferred and what files need to be transferred. The two disk drives would yield a combined storage capacity of 1600 MBytes for a good sized gaming area as discussed in section I. Additional disks could be added if dictated by the application's resolution, speed, altitude and rate requirements.

Virtual Photographic Memory 112

The concept of the virtual photographic memory has been discussed in detail in section I. Practical implementation of this memory is driven primarily by cost of the RAMs at the time of detailed design. Section I has focused on memory cell sizes of 64K for photographic cell arrays of 256 H×256 V elements (not resolution of display which is independent of cell size). The required access time of 75 ns is well within static RAM capability. Cell sizes of 256K could alternatively be used. These memories are becoming more available and result in cell array sizes of 512H×512 V elements. The only difference in the design is the amount of transfer time per cell which would be increased approximately four times from about 0.5 seconds for 64K cells to 1.8 seconds for 256K cells. Since the display scanner is working from the active virtual photo memory, the file transfer time difference becomes a moot point. Although the transfer time has gone up by a factor of four, the total amount of data transferred has also increased by a factor of four. A detailed cost/availability/timing analysis needs to be done to pick the final cell array size; 64K or 256K. Both of these seem to be likely choices.

ELEVATION PROCESSOR

Figure 15A:
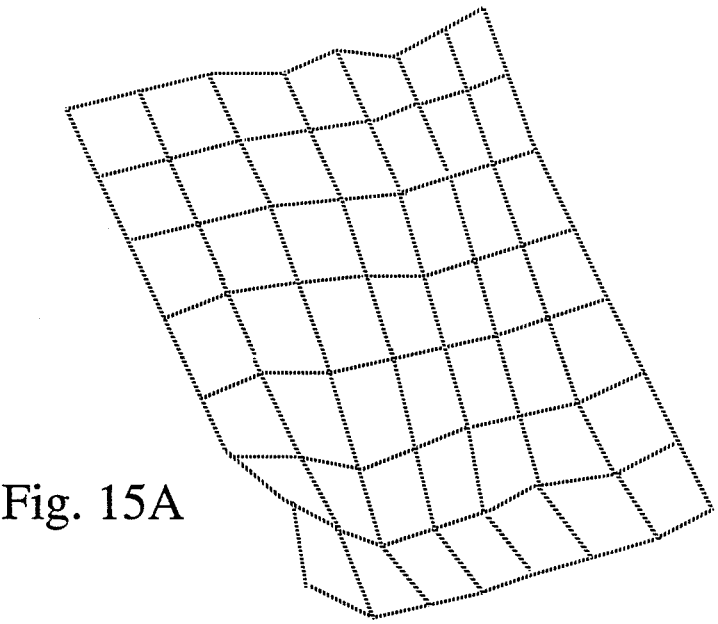
FIGS. 15A and 15B show a DTED map for elevation processing.
Figure 15B:
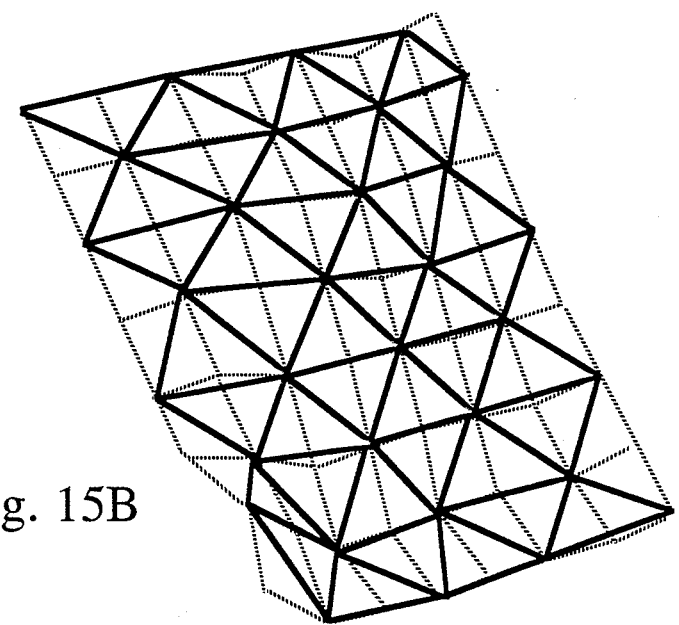

The elevation processor is used if vertical relief is required. The element processor does the standard CIG (Computer Image Generator) coordinate transformation to map the photographic data base coordinates into display scene coordinates. The elevation processor breaks the scene into triangular sections as shown in FIGS. 15A and 15B. The vertices of these sections are transferred into screen coordinates. The boundaries of each triangular section are then determined for each scan line crossing. The slope of the scan line in the real world coordinate system is determined for each display line section. The slope and its starting point coordinate are sent to an array which is stored in the sweep memory. The advantage of the elevation processor over conventional CIG techniques is that only a relatively few points need to be processed. The digital scanner linearly interpolates photographic scene elements between the calculated elevation display coordinates.

FIGS. 16A–16F and 17A–17F illustrate the step-by-step method used by the elevation processor and makes rough estimates of computing power required to do the processing in real time. For a typical scene, an 8×8 matrix of DTED is shown. Notes for FIG. 16

1. Solid rectangle represents active display area.
2. Dotted lines represent flat triangular polygons.

THE ELEVATION PROCESS

This process must be done once per frame.

Figure 16A:
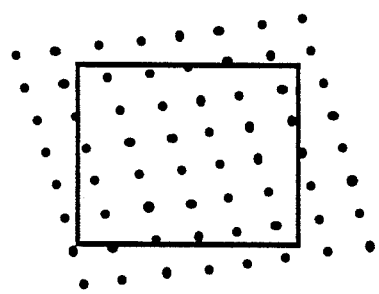
FIGS. 16A-16F and 17A-17F are diagrams showing the steps for elevation processing.
Figure 16B:
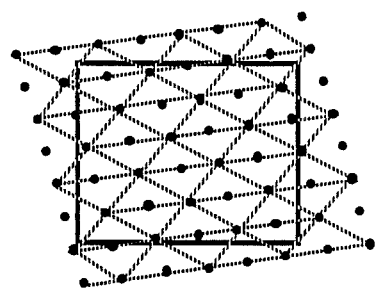

Step 1 (FIGS. 16A & 16B)

An 8×8 grid of elevation points centered about the display window is determined. This grid is segmented into "flat" triangular polygons in preparation for processing. The triangular structure may or may not lie along the same axis as display coordinates (see FIGS. 15, 15B, 16A and 16B).

Figure 16C:
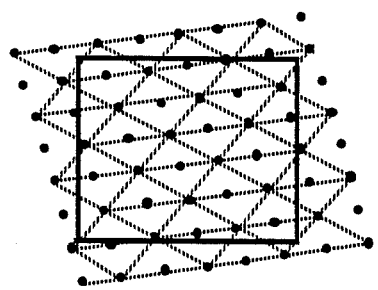

Step 2 (FIG. 16C)

The coordinate transformation matrix for any point in space mapped into clipping coordinates is computed based upon positional and angular information supplied by the interface and system controller 118. FIGS. 17A–17F show the sequence in which the world coordinate system $(X_W, Y_W, Z_W)$ is changed into the clipping coordinate system $(X_C, Y_C, Z_C)$. This transformation is built up from several translations and rotations that are determined from the viewing parameters. Each of the transformation matrices is 4×4. The operations and their corresponding transformation forms are shown below.

| OPERATION | APPROXIMATE NUMBER OF MULTIPLIES | APPROXIMATE NUMBER OF ADDS |
| --- | --- | --- |
| Translation | 0 | 0 |
| Rotation about X axis | 11 | 2 |
| Rotation about Y axis | 14 | 2 |
| Rotation about X axis | 19 | 6 |
| Rotation about Z axis | 21 | 8 |
| Invert Z axis & transform to clipping coordinates | 13 | 0 |
| Total | 78 | 18 |

$$T_a = \begin{bmatrix} 1 & 0 & 0 & 0 \\ 0 & 1 & 0 & 0 \\ 0 & 0 & 1 & 0 \\ T_x & T_y & T_z & 1 \end{bmatrix}$$

$$T_b = \begin{bmatrix} 1 & 0 & 0 & 0 \\ 0 & \cos u & -\sin u & 0 \\ 0 & \sin u & \cos u & 0 \\ 0 & 0 & 0 & 1 \end{bmatrix}$$

$$T_c = \begin{bmatrix} \cos u & 0 & \sin u & 0 \\ 0 & 1 & 0 & 0 \\ -\sin u & 0 & \cos u & 0 \\ 0 & 0 & 0 & 1 \end{bmatrix}$$

$$T_d = \begin{bmatrix} 1 & 0 & 0 & 0 \\ 0 & \cos u & -\sin u & 0 \\ 0 & \sin u & \cos u & 0 \\ 0 & 0 & 0 & 1 \end{bmatrix}$$

$$T_e = \begin{bmatrix} \cos u & -\sin u & 0 & 0 \\ \sin u & \cos u & 0 & 0 \\ 0 & 0 & 1 & 0 \\ 0 & 0 & 0 & 1 \end{bmatrix}$$

$$T_f = \begin{bmatrix} S_x & 0 & 0 & 0 \\ 0 & S_y & 0 & 0 \\ 0 & 0 & S_z & 0 \\ 0 & 0 & 0 & 1 \end{bmatrix}$$

The resultant transformation is $V = T_a T_b T_c T_d T_e T_f$

Step 3 (FIG. 16C)

Transform each of the 64 points from world coordinates to clipping coordinates using the transformation determined in step 2. Subscripts c designate clipping coordinates. Subscripts w designate world coordinates.

$$[X_c\ Y_c\ Z_c\ 1] = [X_w\ Y_w\ Z_w\ 1] \qquad V$$

For 64 points, this operation requires approximately 832 multiples and 130 adds.

Figure 16D:
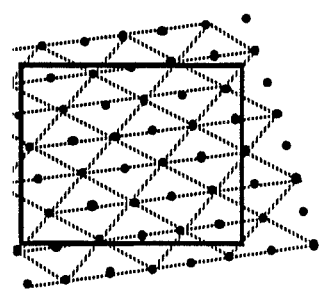
Figure 16:
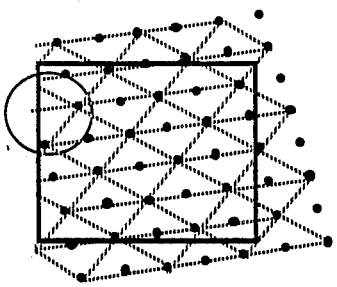
Figure 16:
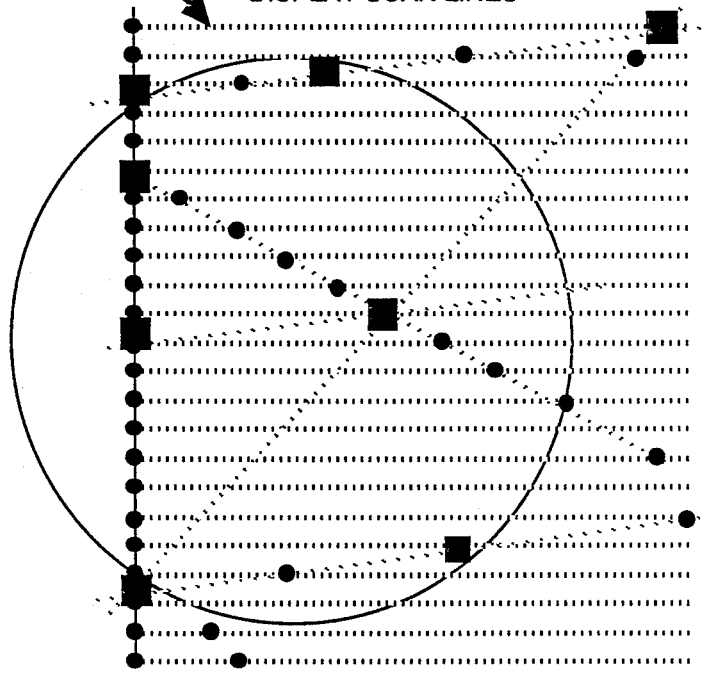
Figure 17:
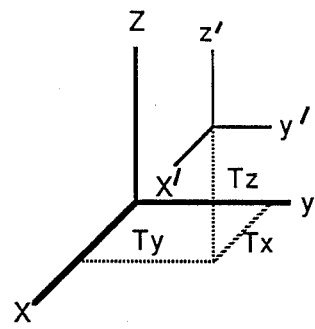
Figure 17:
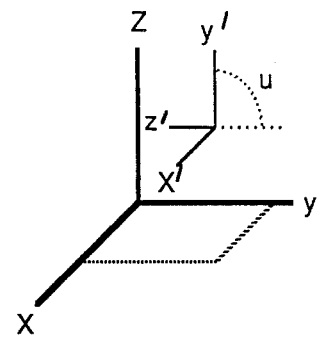
Figure 17:
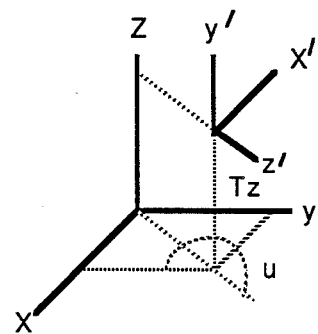
Figure 17:
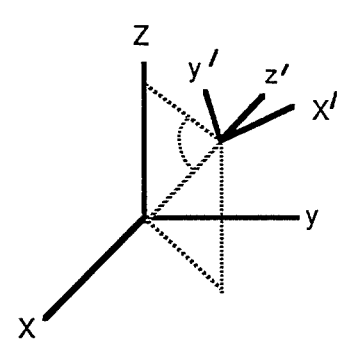
Figure 17:
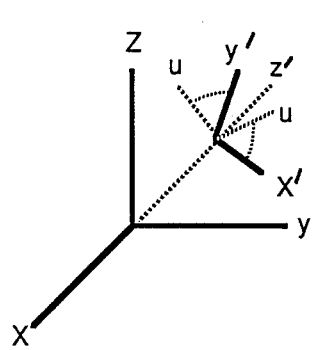
Figure 17:
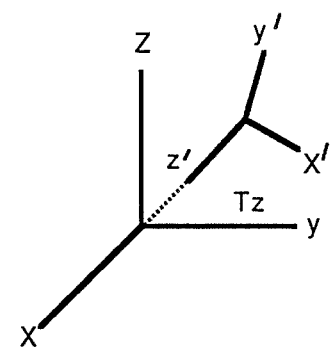

Step 4 (FIG. 16D)

Only the lines which cross the left hand edge of the display need to be clipped due to the way in which the digital memory scanner works. This reduces the number of times the clipping algorithm must be performed by about 758%. For a typical case, approximately 12 lines will need to be clipped. For 12 lines, this operation requires approximately 204 multiples and 144 adds.

Step 5 (FIG. 16E)

Screen coordinates are calculated for the remaining 52 points. The s subscript indicates screen coordinates.

$$X_s = K_1(X_c/Z_c) + K_2$$

$$Y_s = K_3(Y_c/Z_c) + K_4$$

For 52 points, this operation requires approximately 208 multiples and 104 adds.

Step 6 (FIG. 16F)

Calculate the intersection of each line segment with each scan line. In order to minimize the number of calculations, the intersections are calculated starting at a vertex and using the incremental slope to determine the intersection at each successive line.

The line segment slope, $M = (Y_1 - Y_2)/(X_1 - X_2)$. For a typical 84 line segments, this operation requires approximately 84 multiples and 168 adds.

Once the slopes have been determined, each line crossing requires a single addition of the incremental slope. In a typical picture there are approximately 2880 scan line crossings. This operation requires approximately 2880 adds.

Step 7 (FIGS. 17A-17F)

Determine the incremental slope of the X sweep in world coordinates and of the Y sweep in world coordinates. This is done for each line segment. The result is $M_x$ and $M_y$ which represents the incremental slope in world coordinates for each horizontal increment of a screen pixel.

$$M_x = (X_{w1} - X_{w2})/(X_{s1} - X_{s2})$$

$$M_y = (Y_{w1} - Y_{w2})/(X_{s1} - X_{s2})$$

For the typical 2880 scan line crossings, this operation requires a total of approximately 5760 multiples and 11,520 adds. The resultant points and slopes are stored in the sweep memory for use by the digital memory scanner. The total frame has required approximately 7166 multiples and 14964 add operations.

Figure 18:
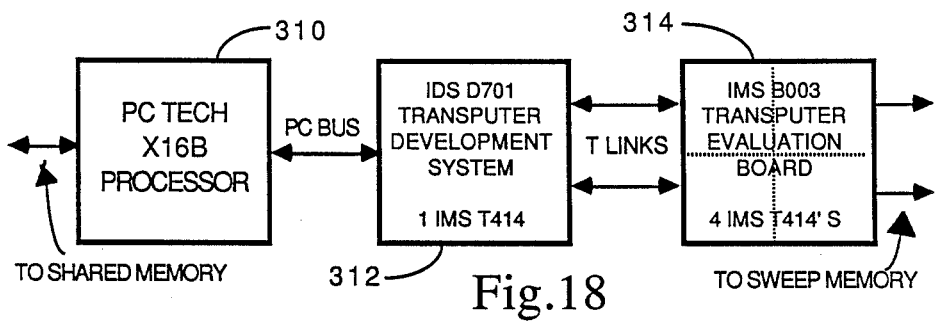
FIG. 18 is a block diagram of an elevation processor for the system of FIG. 13.

The Inmos transputer family is used to implement the elevation processing because it can quickly perform large numbers of mathematical operations. The IMS T414 is a 32-bit transputer providing up to 10 MIPS processing power with memory and communication capability. The transputer provides the building block for the elevation processor. The block diagram in FIG. 18 shows standard Inmos boards which are connected to perform the processing. The transputers are linked for highest concurrency of parallel processing. Ignoring overhead, one single processor could perhaps handle the load, however, the configuration of five transputers shown in the block system is a very flexible system with plenty of spare time and spare processing power.

Sweep Memory

Figure 19:
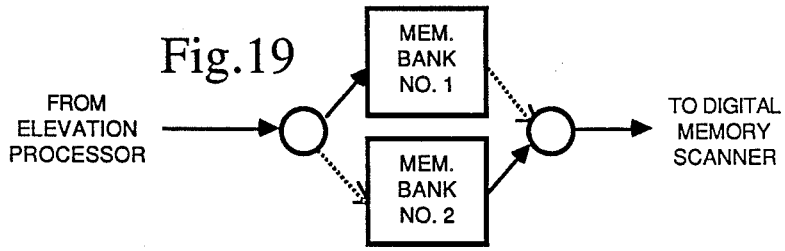
FIG. 19 is a block diagram of a sweep memory for the system of FIG. 13.

Sweep memory 132 in FIG. 13 receives all of its data from the elevation processor 130. This data is stored in an array as illustrated in FIG. 19. The data is stored in one of two identical memory banks. The memories are organized in ping-pong fashion so that data from the elevation processor can be loaded into one bank while the digital memory scanner reads the data out of the other memory bank. The memory array storage format is shown in Table VII.

TABLE VII
MEMORY ARRAY STORAGE FORMAT

| Scan Line No. | Start Boundary Xs | Incremental X Slope Mx | Incremental Y Slope My |
|---|---|---|---|
| 1 | 0 | 10 | 15 |
| 1 | 50 | 15 | 30 |
| 1 | 152 | 18 | 31 |
| 1 | 255 | 20 | 30 |
| 1 | 320 | 20 | 28 |
| 1 | 409 | 22 | 24 |
| 2 | 0 | 10 | 16 |
| 2 | 50 | 15 | 31 |
| 2 | 155 | 19 | 31 |
| 2 | 260 | 21 | 30 |
| 2 | 330 | 20 | 29 |
| 2 | 410 | 21 | 25 |
| 3 | | | |
| 3 | | ETC. | |
| 3 | | | |

Digital Memory Scanner

The digital memory scanner 122 in FIG. 13 is a card which takes the coordinate and slope information that is stored in the active sweep memory bank and generates the addresses for the virtual photographic memory 112. The data supplied by the photographic memory is converted to an analog signal by a D/A unit 122 and then sent to the video mixer 124.

Summary

Figure 20:
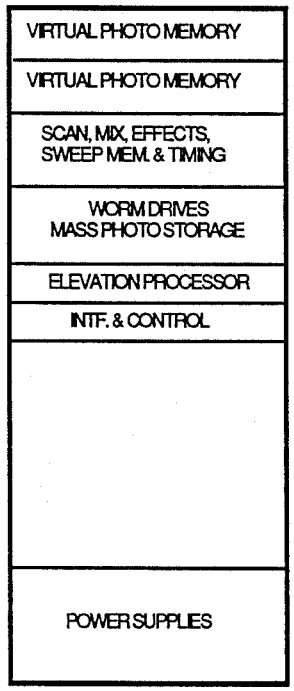
FIG. 20 is a diagram showing a cabinet layout.

Section II of this description illustrates a practical way to implement the photo based image generator using the image data management scheme of section I. The implementation is based upon commercially available components and subsystems. The WORM optical disk drive is used for the photo mass storage device, and a set of transputer cards is used for the elevation processor. The entire single channel image generator can easily fit into a single electronics cabinet as shown in FIG. 20. The architecture is flexible and is designed for future expansion.

EXAMPLE WITH A POND

FIGS. 21a through 21h show how a small irregular shaped pond approximately 50 feet across appears for each level of detail. These example cells contain 16 horizontal by 16 vertical pixels for example only. A typical cell in an actual system would contain 256 H×256 V or 512 H×512 V pixels. FIGS. 22a through 22h show how that pond is stored in each cell A through I. For illustration purposes, only one bit is used per pixel. A "1" represents white and "0" represents black. In practical systems each pixel would be stored as one or more bytes (8 bits). If one byte was used per pixel, $2^8$ or 256 different colors or gray shades could be represented for each pixel.

Note that when only levels of detail A through C are used, the pond is just a blocky shape. As each succeeding level of detail is added, the pond becomes better defined. By the time the final level of detail, I, is added, the pond has been defined to a 3 foot resolution. In actual use, levels A, B, and C would be shown when the pond was far away on the horizon near the top of the picture. As the pond got closer, more levels of interlaced data would be added. Just as your eye can see the pond more clearly as it gets closer, the pond is displayed to higher level of detail as each new cell is added to the virtual memory.

Figure 21I:
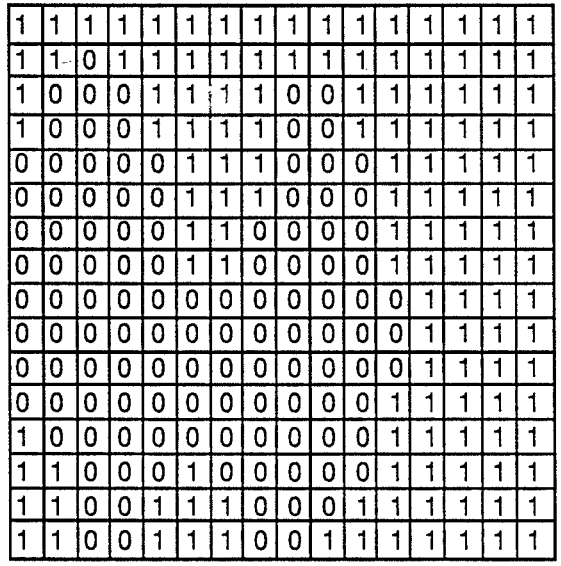
Figures 21A, 21B, 21C, 21D:
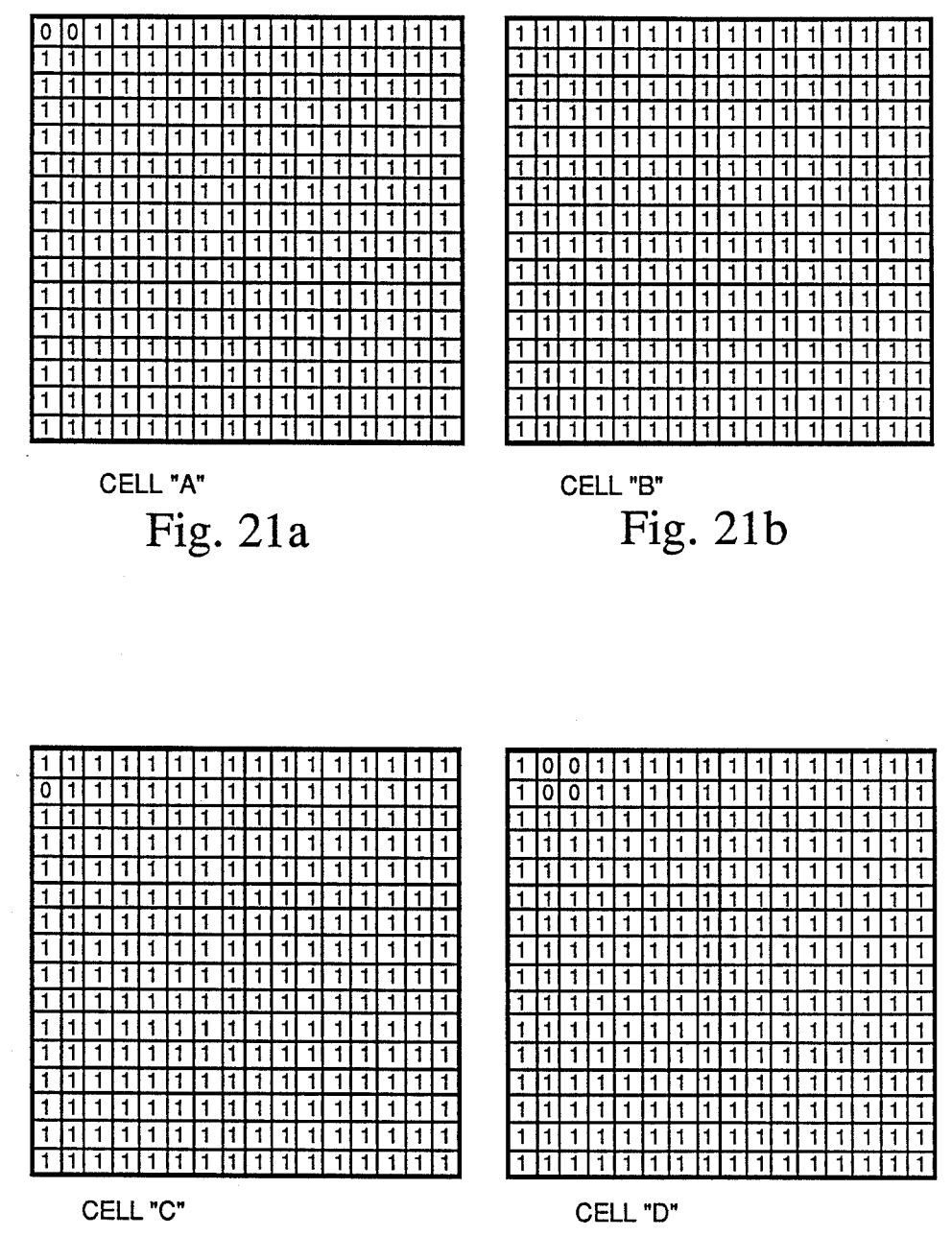
Figures 21E, 21F, 21G, 21H:
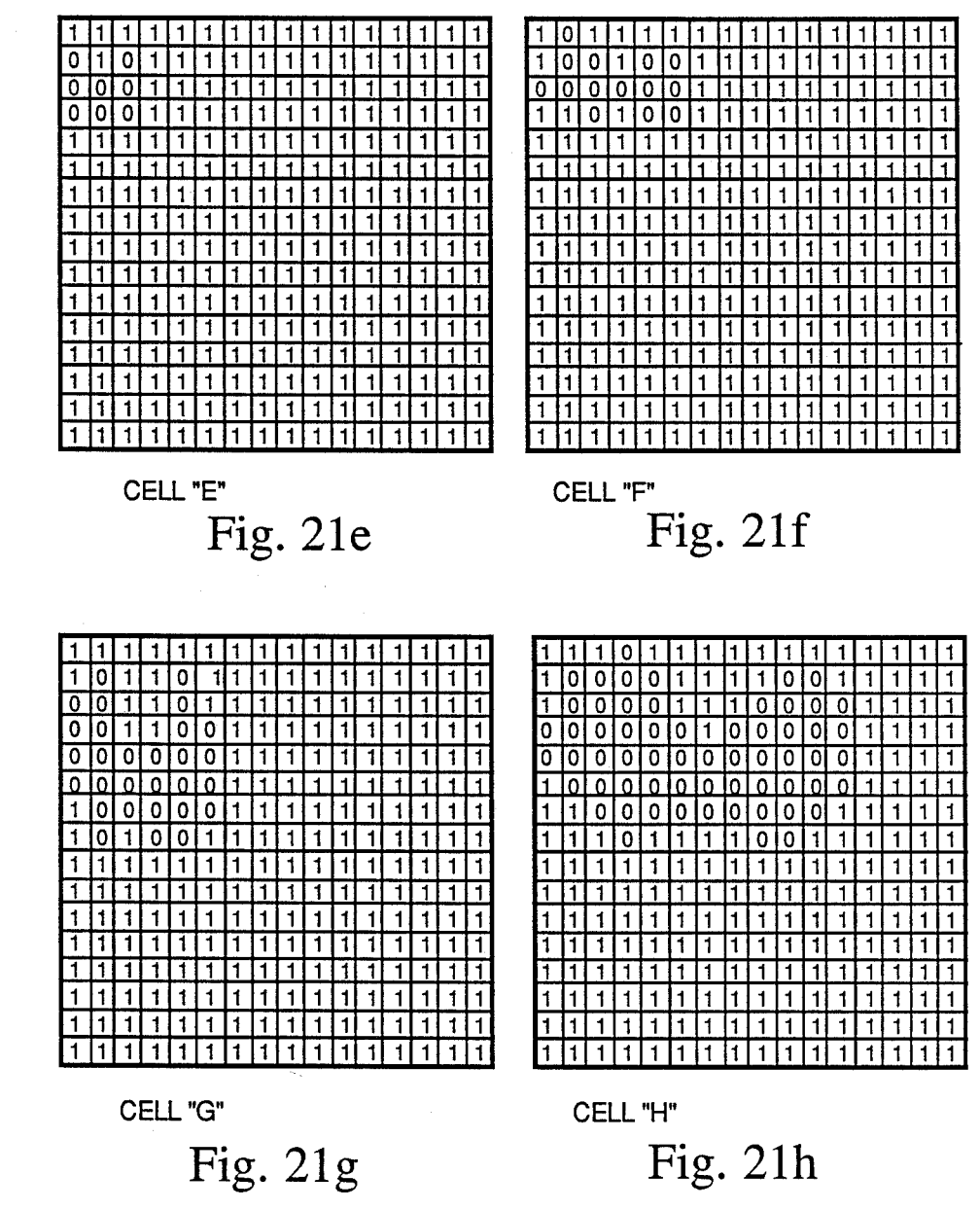

FIG. 22 shows how the pond is stored in each type of memory cell. Note that for simplified illustration purposes only, each cell is shown with only 16×16 pixels. The pond is located near the top left corner of cell A. FIG. 21 shows how each cell uses the same number of pixels, but covers a different amount of ground area. Table II gives a more realistic example of pixel resolution and area coverage for each cell type.

Figure 23:
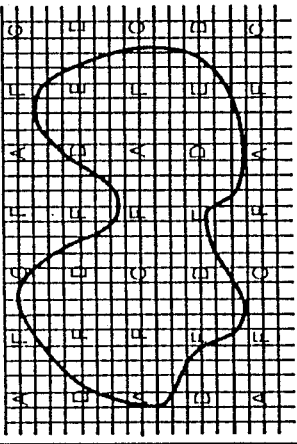
FIG. 23 is a diagram showing levels of detail for the pond.

Using the pond of FIG. 21 as an example, the following description shows how each of the blocks of FIGS. 1 and 2 interact. The initial conditions are shown in FIG. 23 with the virtual memory loaded with cells A thru E.

The Interface and Virtual Memory/Disk Controller 18 receives the new position and look angle from the host computer. This transfer typically occurs 30 times per second so that an updated picture is presented each frame time. The Interface & Virtual Memory/Disk Controller 18 determines the area on the ground to be scanned. It sends the real world co-ordinates (i.e. latitude and longitude) of the corner positions, A1, B1, C1, and D1, to the Digital Memory Scanner 16. It also determines if any areas of higher resolution may be required in certain areas of the picture within the next few frames. If a higher resolution is anticipated, the Interface and Virtual Memory/Disk Controller 18 sends the file address where the required cell is stored to the Disk Storage unit 10. The disk Storage unit 10 starts to access the appropriate file. In this example, cells A thru E for the pond area are assumed to be in memory. The controller 18 anticipates that since the aircraft is approaching the pond, that higher resolution cell "F" will be required for presentation within the next few frames. It sends the address where the pond's cell "F" is stored to the disk storage unit 10 and the disk storage unit 10 begins to access that cell depending upon the location of cell "F" with respect to the last cell which was accessed by the disk 10. The cells are typically stored with general geographic areas stored near to each other physically on the disk 10. Since it is likely that cell "E" for the pond was recently accessed by the disk 10, the disk's read head is probably near the desired pond cell "F" and the disk access is short. The controller 18 determines if there is an empty cell in the virtual memory 12 or, if not, which of the existing cells is no longer required. From FIG. 4, it can be seen that for any given condition, there are more cells in the virtual memory 12 than required to store the data. Therefore, there will always be a cell which is no longer required. This cell is available to be reallocated for the new cell. Once the available cell is determined by the controller 10, the controller 10 sends a NULL address to the cell's mapping RAM 14. This null essentially disables the cell while it is being loaded with the new cell information by the disk storage unit 10. After the cell has been loaded with new information (perhaps several frames later), the controller 18 will send the real world address of the pond cell "F" to the virtual memory cell which has been loaded with pond cell "F" data. This real world address is used during scanning to decode the cell data. In addition to the address, the controller 18 sends the mapping RAM the cell level which is stored. In this case the "F" level is sent since the virtual memory cell is now storing an "F" level cell. The "F" becomes the cell's priority level as described elsewhere in this description.

Figure 24:
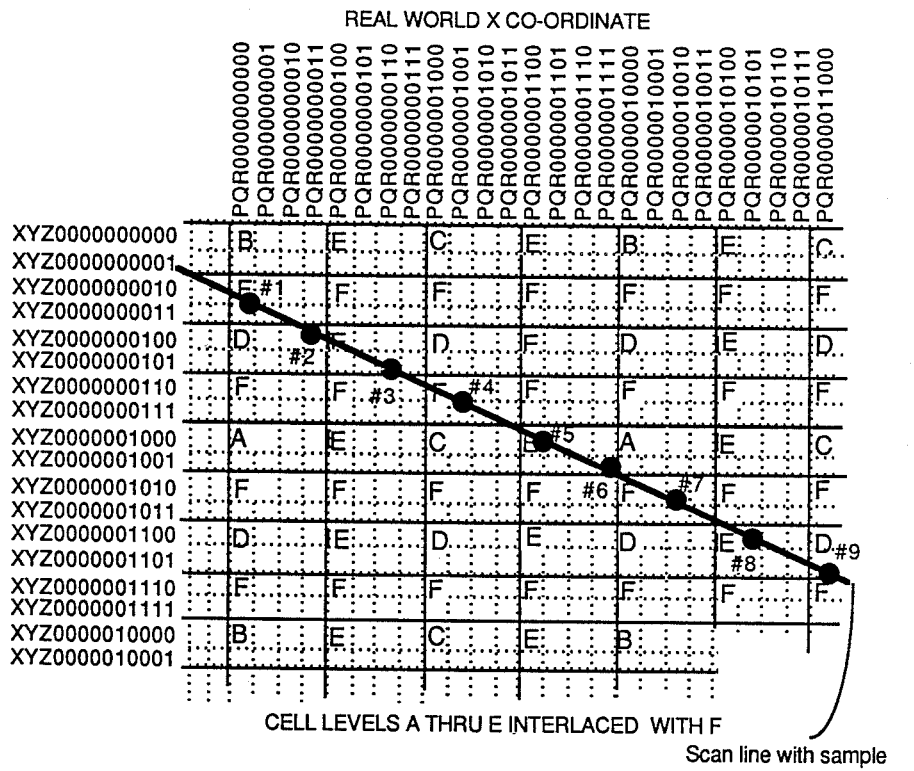
FIG. 24 is a diagram showing a scan line sample for the pond.

The digital memory scanner 15 takes the four real world co-ordinate corner points of the picture and computes the instantaneous real world co-ordinates as the display's scanning beam draws the picture. Referring to FIG. 23, assume that the pond cells "A" thru "F" have been loaded into memory and that the scanner is displaying a line which contains the pond. FIG. 24 shows an expansion of one line. The scanner sends the address as listed in FIG. 24 to all of the virtual memory cells as it scans across the line. The decoders in each of the virtual cells' mapping RAMs 14 determine if the real world co-ordinates are contained in the cells. For this example and scanning line, the cells which can be decoded for each pixel are listed in FIG. 24. For each pixel in the scanned line, all of the cells which meet the decoding criteria attempt to output their data to the video pixel data bus. However, only the cell with the highest priority is enabled, so only that cell's data is put on the video pixel data bus. This pixel's data is sent to the digital memory scanner 16 where it is run through a D/A converter for presentation on the raster display 20.

To illustrate the detailed operation of the cell, consider pixels in the scanned line and pond cell "F". Refer to FIG. 2 for the data paths inside the cell, and to FIG. 24 for the decoding criteria. As described earlier, the cell's mapping RAM 14 is initially loaded with a "NULL". At this time the digitized cell (file) data bus from the disk storage area 10 is enabled. The cell address bus from the mass storage reader is also enabled. As the file is read from the disk 10, the cell data is stored into the memory cell. Since it was originally stored on the disk in the interlaced format, it is also stored into the virtual memory cell in interlaced format. After the loading of the cell is complete, the decoding and control data for the mapping RAM is loaded. For the example pond cell, the decoding word may be "XYZ", and the cell priority level is "F". Now consider the operation of the cell as the digital scanner sends real world co-ordinates for a line which cuts across the pond, as shown in FIG. 24. The real world co-ordinate from the digital scanner 16 is placed on the address bus for the current pixel. It is compared to the decoding word "XYZ" to see if it satisfies the criteria. If it satisfies the criteria as illustrated in FIG. 24, the cell activates the priority request line. In this example, priority request line "F" is activated, and an appropriate portion of the real world address is relayed into the mapped cell address and onto the cell's address bus. Simultaneously the cell checks to see if any other cell has activated a higher priority line, for example, priority request lines "G", "H", "I", etc. If the cell has activated its priority request line, and no other cells have activated higher priority levels, the cell enables its output data. The data is placed onto the video pixel data bus which is sent to the digital scanner. The scanner converts this data into the analog video for presentation by the raster display.

Note that in the previous example there may have been more than one priority level"F" type cell in virtual memory. However, only one of those cells could satisfy the decoding criteria for a geographical co-ordinate and only that one could enable its data onto the video pixel data bus.

As illustrated by the previous example, all of the cells are simultaneously looking at the real world co-ordinates from the digital scanner 16. Each cell acts independently with its own decoding criteria. This technique makes the interlacing and decoding of data instantaneous; each pixel of data is automatically retrieved from the highest priority level cell in real time.

The simple decoding technique described above also permits the system to use a minimum number of disk storage devices. For example, assume that in the above example, the ideal pond representation includes pond levels "A" thru "F". If the disk did not have time to finish loading level "F" before it was needed, the virtual cell memory would automatically display levels "A" through "E". Although the pond would not have quite as much detail as desired, it would be properly displayed in a slightly lower resolution. As soon as the loading of pond cell "F" was completed, the increased resolution would automatically be interlaced.

TABLE VIII

SCAN LINE EXAMPLE

| SAMPLE POINT | REAL WORLD X CO-ORDINATE | REAL WORLD Y CO-ORDINATE | CO-ORDINATE SATISFIES DECODER CRITERIA* | CELL MEMORY ADDR. 8MSB (X) | CELL MEMORY ADDR. 8LSB (Y) |
|---|---|---|---|---|---|
| 1 | PQR0000000000 | XYZ0000000011 | YES | 00000000 | 00000000 |
| 2 | PQR0000000011 | XYZ0000000100 | NO | N/A | N/A |
| 3 | PQR0000000110 | XYZ0000000101 | NO | N/A | N/A |
| 4 | PQR0000001001 | XYZ0000000111 | YES | 00000010 | 00000001 |
| 5 | PQR0000001100 | XYZ0000001000 | NO | N/A | N/A |
| 6 | PQR0000001111 | XYZ0000001001 | NO | N/A | N/A |
| 7 | PQR0000010010 | XYZ0000001011 | YES | 00000100 | 00000010 |
| 8 | PQR0000010101 | XYZ0000001100 | NO | N/A | N/A |
| 6 | PQR0000011000 | XYZ0000001101 | NO | N/A | N/A |

Note:
°The mapping ram decoder key for Pond Cell "F" used in this example is - -
X World Co-ordinate = PQRxxxxxxxx(DC)(DC)
Y World Co-ordinate = XYZyyyyyyyy(DC) where PQR are the most significant X bits of Pond Cell "F".
XYZ are the most significant Y bits of Pond Cell "F".
xxxxxxxx are the eight bits which are mapped into the eight MSB of the Pond Cell "F".
yyyyyyyy are the eight bits which are mapped into the eight LSB of the Pond Cell "F".
A "1" indicates that a "1" must exist to satisfy the key.
A "0" indicates that a "0" must exist to satisfy the key.
A "DC" indicates that a "Don't Care" can exist. Either a "0" or a "1" will satisfy the mapping ram key.

If the decoder criteria is satisfied (i.e. a Yes), the cell's priority request line "F" is enabled. The address to the pond cell is as indicated. If no higher priority request line has been enabled by another cell, the memory output lines are enabled and the data stored in the addressed memory location is output to the video output pixel data bus.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. An image data management system for generating image data for a visual system in successive frames at a given frame rate for display on a display device in accordance with viewing data from a host central processing unit, said system comprising:

a first memory for mass storage, a second memory used as a virtual image memory, a digital memory scanner, a controller coupled to the first and second memories and to the digital memory scanner for control thereof, first address bus means and first data bus means coupled from the first memory to the second memory, second address bus means coupled from the memory scanner to the second memory, second data bus means coupled from the second memory to the digital memory scanner for transferring video data, an image display bus coupled from the digital memory scanner to the display device, and a CPU bus coupled from the host central processing unit to said controller and also to the digital memory scanner;

means for organizing the first memory in files of photo-based digitized images in an interlaced data format on a non-compressed pixel-by-pixel basis using cells at N different levels, from level 1 having least detail to level N having the highest detail, with each file comprising a given number of digital data elements at only one of said levels for one cell, and each data element having a predetermined number of bits;

means for organizing the second memory as a plurality of cells, with each cell comprising a data storage area of a size for storing one of said files in the same interlaced data format as in the first memory, and a mapping unit having mapping random access memory and address decoding logic, the mapping unit being coupled to said controller via a mapping and control signal bus for receiving decoding and control data;

wherein the CPU bus is used as means for providing said viewing data from the host central processing unit to the controller, with the viewing data including information relating to position and look angle, wherein said controller includes means for controlling the first address bus means and the first data bus means to direct transfers of the files of data from the first memory into the second memory, with only one cell of the first memory being accessed at any one time, and an entire file of data being stored in one cell of the second memory, the files stored into the second memory being determined by said viewing data, the files of data being placed into cells of the second memory which are unused or no-longer-needed cells, and wherein the controller simultaneously loads the mapping unit with appropriate decoding and control data via the mapping and control signal bus for use by the digital memory scanner to find the interlaced data;

wherein said digital memory scanner includes means for taking viewing data from the controller, using the viewing data to select a level of detail for each area of a display and to generate addresses of data required to create a display, accessing the cells of the second memory via the second address bus means, and via the mapping unit of each cell to cause video data to be transferred from the data storage areas of selected cells via the second data bus means, formatting the data for each area of a display in accordance with the level of detail selected, by interlacing the data for a number of levels from level 1 to the level of detail selected for each said area, and supplying frames of video data via the image display bus to the display means.

2. An image data management system as set forth in claim 1, wherein the visual system is a flight simulator system;

wherein said means for organizing the first memory in an interlaced data format comprises means for storing digitized images with the highest resolution and covering the smallest area used in the visual system, with a first type set equal to one half the data elements distributed over one such image forming a file at level N, with a second type set having one-fourth of the data elements forming a file at level N−1, with each lower level file being formed from twice as many such images as the next higher level with half as many elements from each, with the elements falling between elements used for the higher level files, except that files at level 1 use the same number of such images and the same number of elements from each as the files at level 2.

3. An image data management system as set forth in claim 2;

which includes a sweep memory coupled between the controller and the digital memory scanner for receiving viewing data from the controller and storing an array of coordinates and scan slopes required by the digital memory scanner;

which further includes an elevation processor coupled between the controller and the sweep memory with means for performing matrix operations which are used to give the display images vertical relief by warping images in small sections.

4. An image data management system as set forth in claim 1, wherein said mapping unit and address decoding logic includes means providing an automated means of reconstructing the scene and relaying the image in a pixelized video format to the display, reconstruction of the image being an integral part of the addressing and mapping scheme, and wherein the decoding logic includes means which allows the interlacing of data on a pixel-by-pixel basis using the mapping random access memory, with the mapping ram including means for implementing an automatic technique for addressing any pixel within the file based upon its earth location, which type of mapping allows the features to be read out of the several files at once and automatically reassembled into a picture by the hardware mapping ram, without the use of additional computer processing power, and allowing any cell within the second memory to be utilized at any time for any file, and at any interlaced resolution.

* * * * *

UNITED STATES PATENT AND TRADEMARK OFFICE
CERTIFICATE OF CORRECTION

PATENT NO. : 4,878,183
DATED : October 31, 1989
INVENTOR(S) : Ron B. Ewart

It is certified that error appears in the above-identified patent and that said Letters Patent is hereby corrected as shown below:

Title page:

In the Abstract, line 7, "would" should be "could".

Col 4, line 54, "Fir" should be "For".

Col 11, line 60, "call" should be "cell".

Col 17, line 58, "758" should be "75".

Col 20, line 67, "15" should be "16".

Col 21, line 64, "the priority" should be "its priority".

Signed and Sealed this

Sixth Day of August, 1991

*Attest:*

HARRY F. MANBECK, JR.

*Attesting Officer*     *Commissioner of Patents and Trademarks*